US009248984B2

(12) United States Patent  (10) Patent No.: US 9,248,984 B2
Andre et al.  (45) Date of Patent: Feb. 2, 2016

(54) UNIVERSAL SYSTEM FOR THE LOADING/UNLOADING AND RAIL TRANSPORT OF ROAD SEMITRAILERS

(75) Inventors: Jean-Luc Andre, Molsheim (FR); Jacques Ober, Strasbourg (FR)

(73) Assignee: LOHR INDUSTRIE, Hangenbieten (FR)

( * ) Notice: Subject to any disclaimer, the term of this patent is extended or adjusted under 35 U.S.C. 154(b) by 386 days.

(21) Appl. No.: 13/812,911

(22) PCT Filed: Jul. 26, 2011

(86) PCT No.: PCT/IB2011/053322
§ 371 (c)(1),
(2), (4) Date: Mar. 7, 2013

(87) PCT Pub. No.: WO2012/014150
PCT Pub. Date: Feb. 2, 2012

(65) Prior Publication Data
US 2013/0272828 A1  Oct. 17, 2013

(30) Foreign Application Priority Data
Jul. 30, 2010 (FR) ...................................... 10 03235

(51) Int. Cl.
*B65G 67/04*  (2006.01)
*B61D 3/18*  (2006.01)
(Continued)

(52) U.S. Cl.
CPC ............... *B65G 67/04* (2013.01); *B61D 3/182* (2013.01); *B61D 3/184* (2013.01); *B61D 45/005* (2013.01); *B61D 47/00* (2013.01); *B61D 47/005* (2013.01); *B65G 67/24* (2013.01); *Y02T 30/30* (2013.01)

(58) Field of Classification Search
CPC .... B61D 3/184; B61D 45/004; B61D 45/005; B61D 47/005

USPC .................................. 410/1, 58–60; 414/333
See application file for complete search history.

(56) References Cited

U.S. PATENT DOCUMENTS 2,246,543 A * 6/1941 Smith ............................... 410/1
2,637,453 A * 5/1953 Cleveland .................. 414/140.1
(Continued)

FOREIGN PATENT DOCUMENTS

DE  32 34 375 A1  3/1984
EP  1 712 444 A1  10/2006
(Continued)

OTHER PUBLICATIONS

French Search Report Corresponding to FR 10/03235.
(Continued)

*Primary Examiner* — James Keenan
(74) *Attorney, Agent, or Firm* — Davis & Bujold PLLC; Michael J. Bujold

(57) ABSTRACT

A system for loading, unloading and rail transportation of road-hauled semi-trailers, having multiple wagons (1) constituting a railway train, with each of them incorporating at least one pivotable turntable (14) for accommodating a semi-trailer via its wheel assembly. The system also comprises a detachable hitch mounting (9) that can be gripped by a handling machine which carries the detachable mounting and assembles it, after adjustment on the semi-trailer's pivoting turntable. The hitch mounting is assembled on an accommodating platform (8) that is secured immobile to the wagon chassis (2) and independently of the pivoting turntable, in order to support the front of the semi-trailer during rail transportation. This invention is of interest to rail carriers and railway transport equipment manufacturers.

24 Claims, 15 Drawing Sheets

(51) Int. Cl.
*B61D 45/00* (2006.01)
*B61D 47/00* (2006.01)
*B65G 67/24* (2006.01)

(56) References Cited

U.S. PATENT DOCUMENTS

| | | | |
|---|---|---|---|
| 2,903,977 A * | 9/1959 | Ulinski | 414/333 |
| 3,019,917 A * | 2/1962 | Ajero | 414/396 |
| 3,075,479 A * | 1/1963 | Goby | 410/1 |
| 3,250,506 A | 5/1966 | Thouvenelle et al. | 410/56 |
| 3,352,438 A * | 11/1967 | Davidson | 414/333 |
| 3,490,389 A * | 1/1970 | Brown | 414/577 |
| 3,576,167 A * | 4/1971 | Macomber | 414/352 |
| 3,881,619 A * | 5/1975 | Morris | 414/607 |
| 3,916,799 A * | 11/1975 | Smith | 410/1 |
| 4,129,079 A * | 12/1978 | Shannon | 410/1 |
| 4,425,064 A | 1/1984 | Walda et al. | |
| 4,653,966 A * | 3/1987 | Bakka et al. | 410/1 |
| 4,671,714 A * | 6/1987 | Bennett | 410/57 |
| 4,776,735 A * | 10/1988 | Walda et al. | 410/1 |
| 4,780,033 A * | 10/1988 | Walda et al. | 410/1 |
| 4,792,269 A * | 12/1988 | Engle | 410/53 |
| 4,880,341 A * | 11/1989 | Van Den Pol | 410/1 |
| 5,059,072 A * | 10/1991 | Holt | 410/60 |
| 5,246,081 A * | 9/1993 | Engle | 180/19.2 |
| 5,281,072 A * | 1/1994 | Patouillard et al. | 414/349 |
| 5,551,815 A * | 9/1996 | Rainbow et al. | 410/58 |
| 6,439,594 B1* | 8/2002 | Johansson | 280/425.1 |
| 8,365,674 B2* | 2/2013 | Banwart | 105/3 |
| 8,528,929 B2* | 9/2013 | Kimener | 280/476.1 |
| 2013/0078078 A1* | 3/2013 | Andre et al. | 414/809 |

FOREIGN PATENT DOCUMENTS

| | | | |
|---|---|---|---|
| EP | 2388173 A2 * | 11/2011 | B61D 3/18 |
| WO | WO 01/98127 A1 * | 12/2001 | B61D 3/184 |

OTHER PUBLICATIONS

International Search Report Corresponding to PCT/IB2011/053322.

* cited by examiner

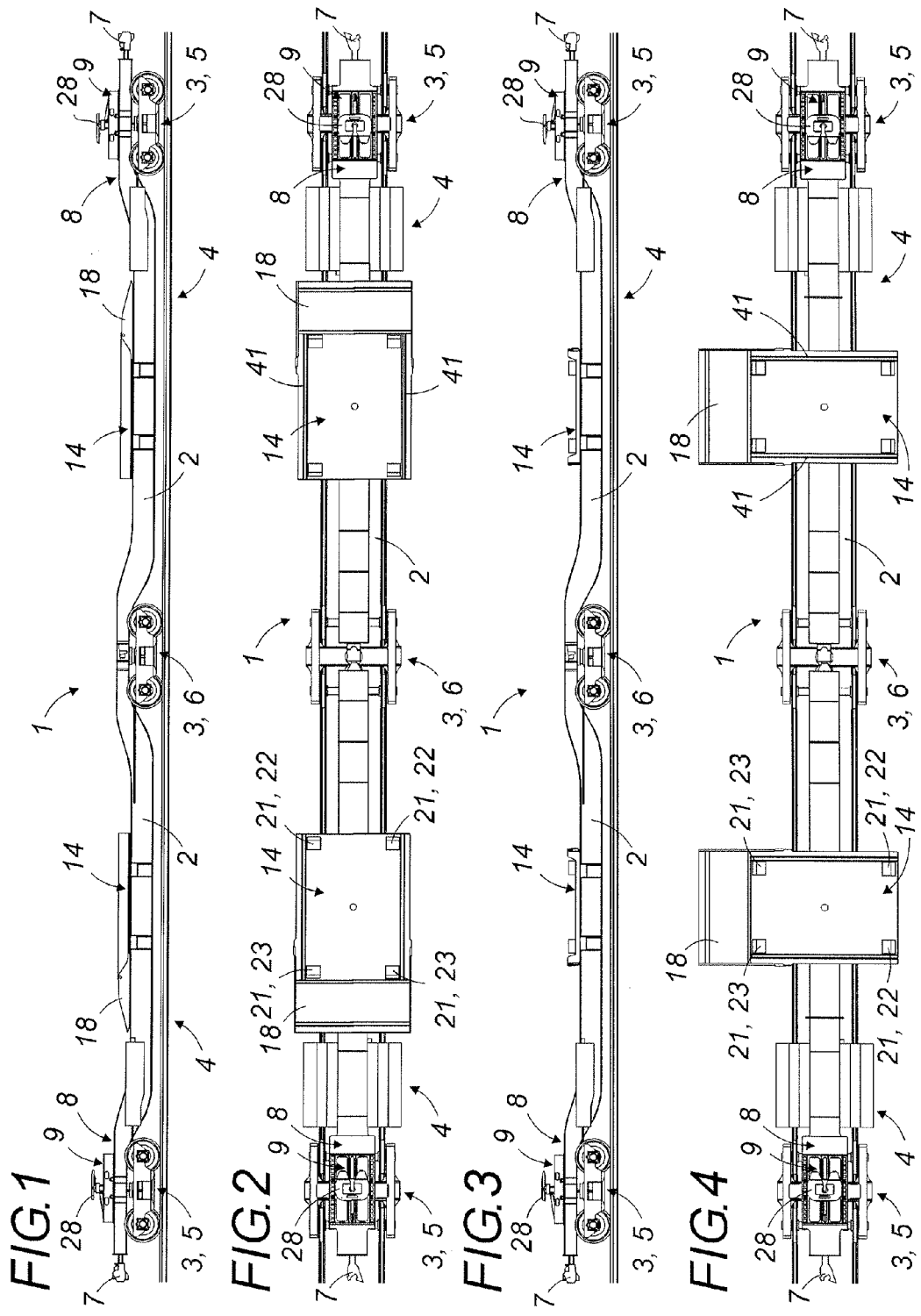

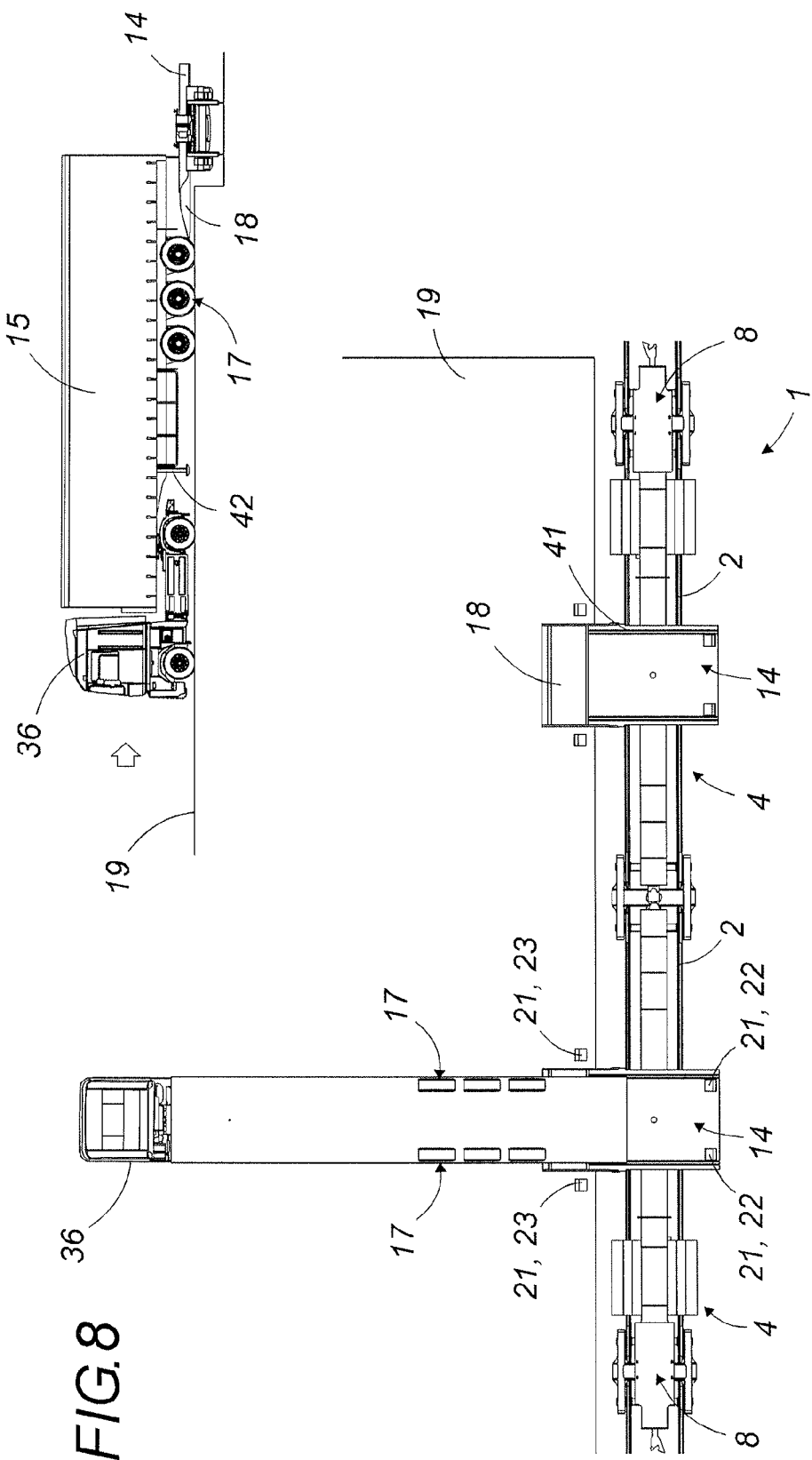

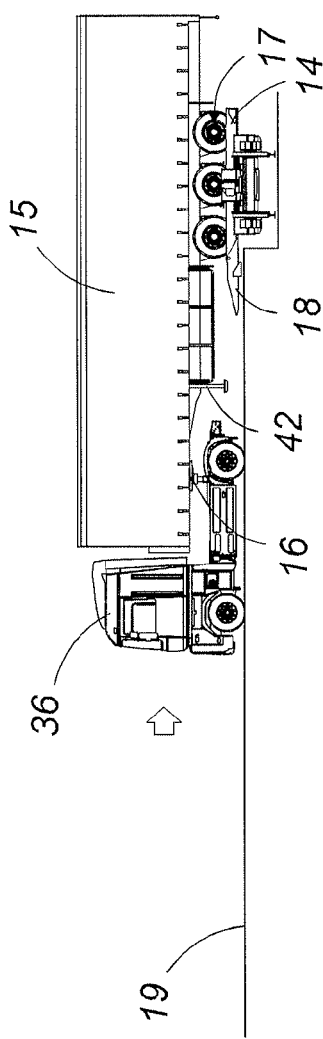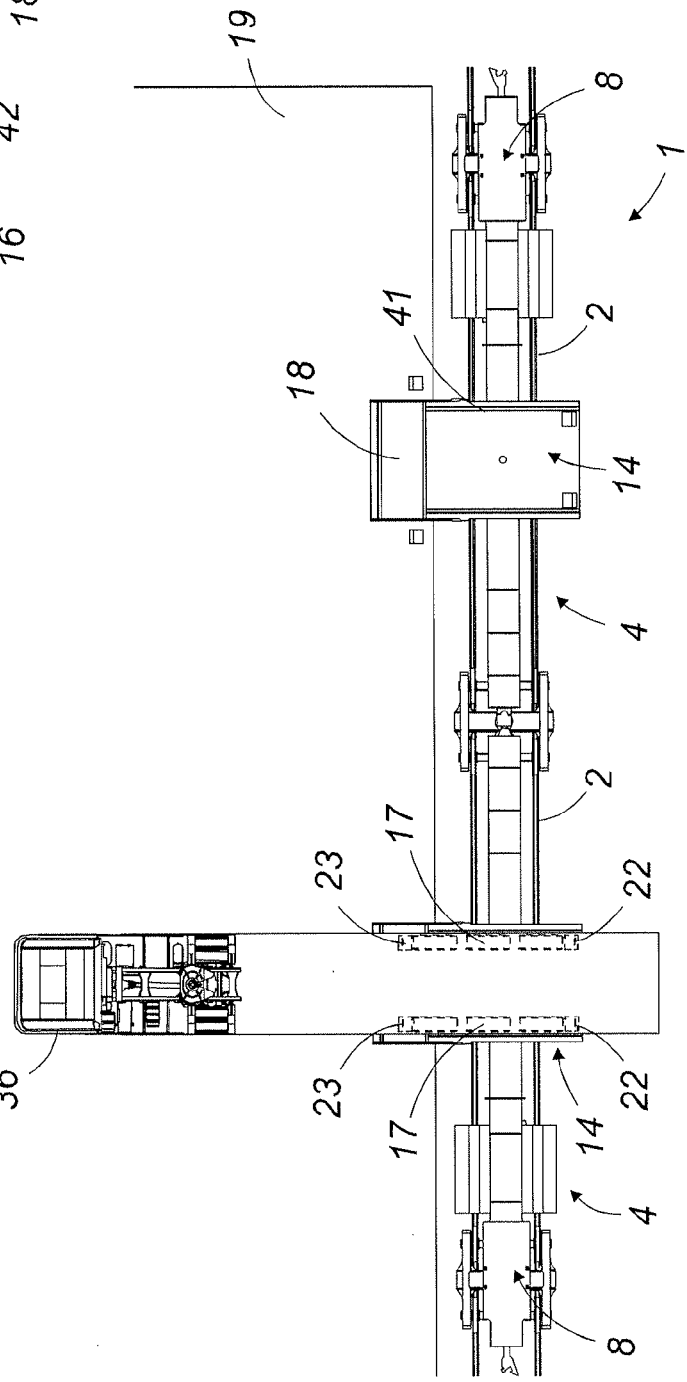

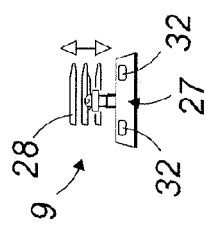
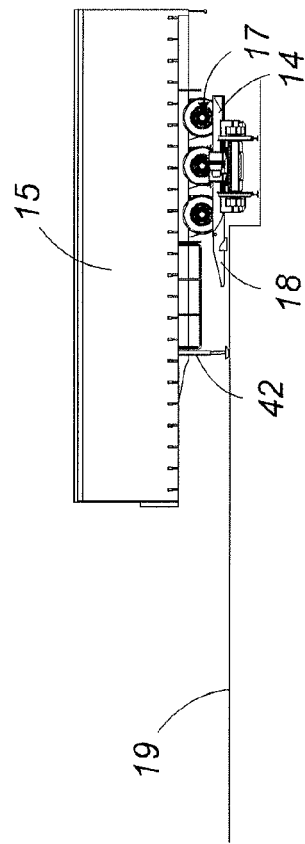
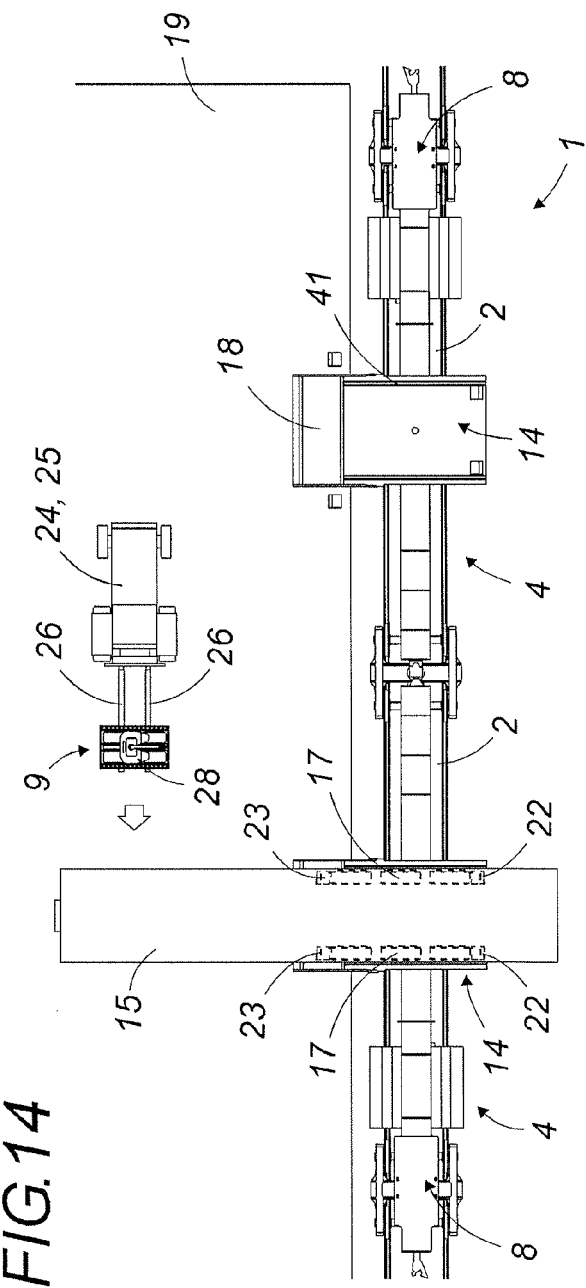

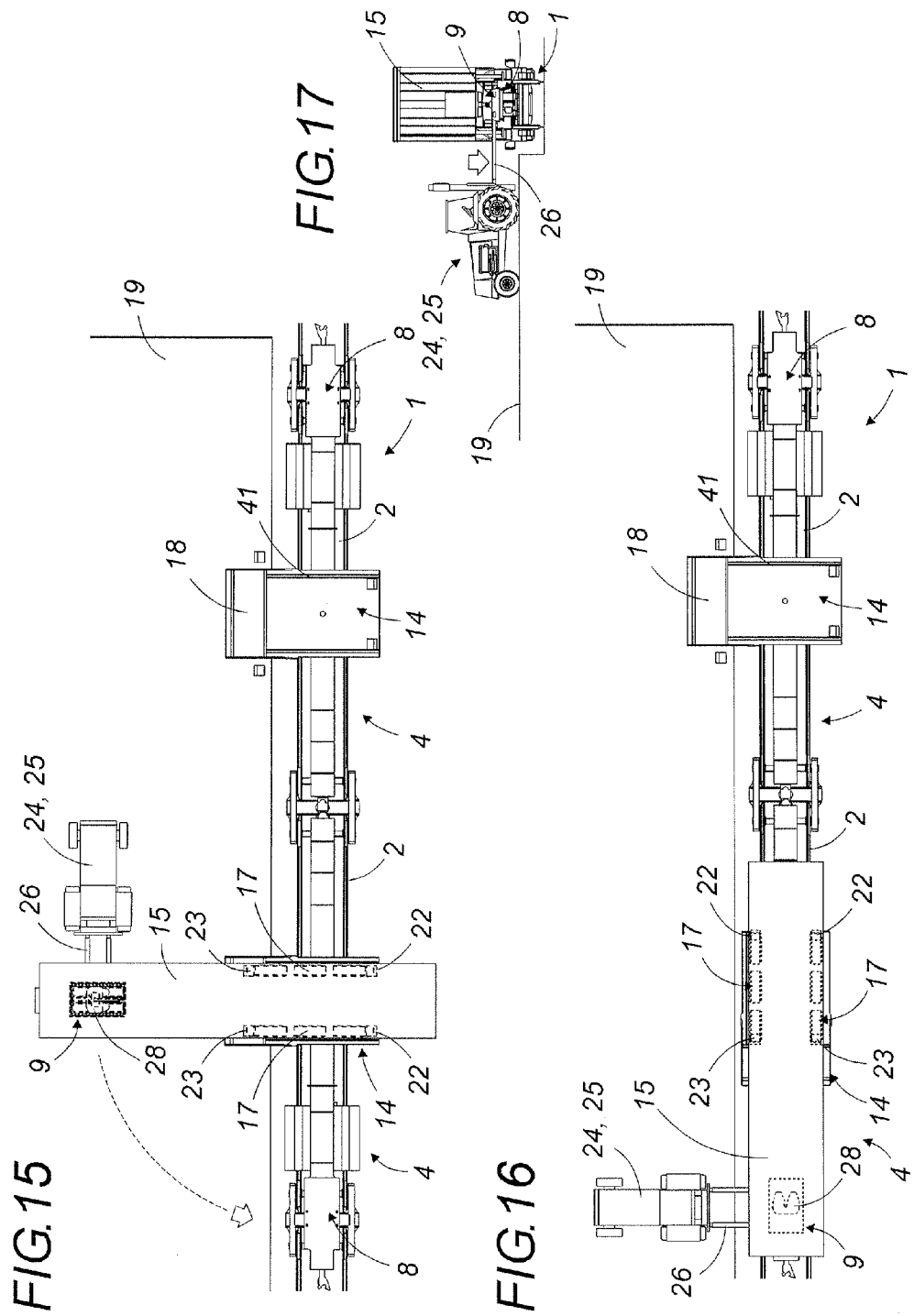

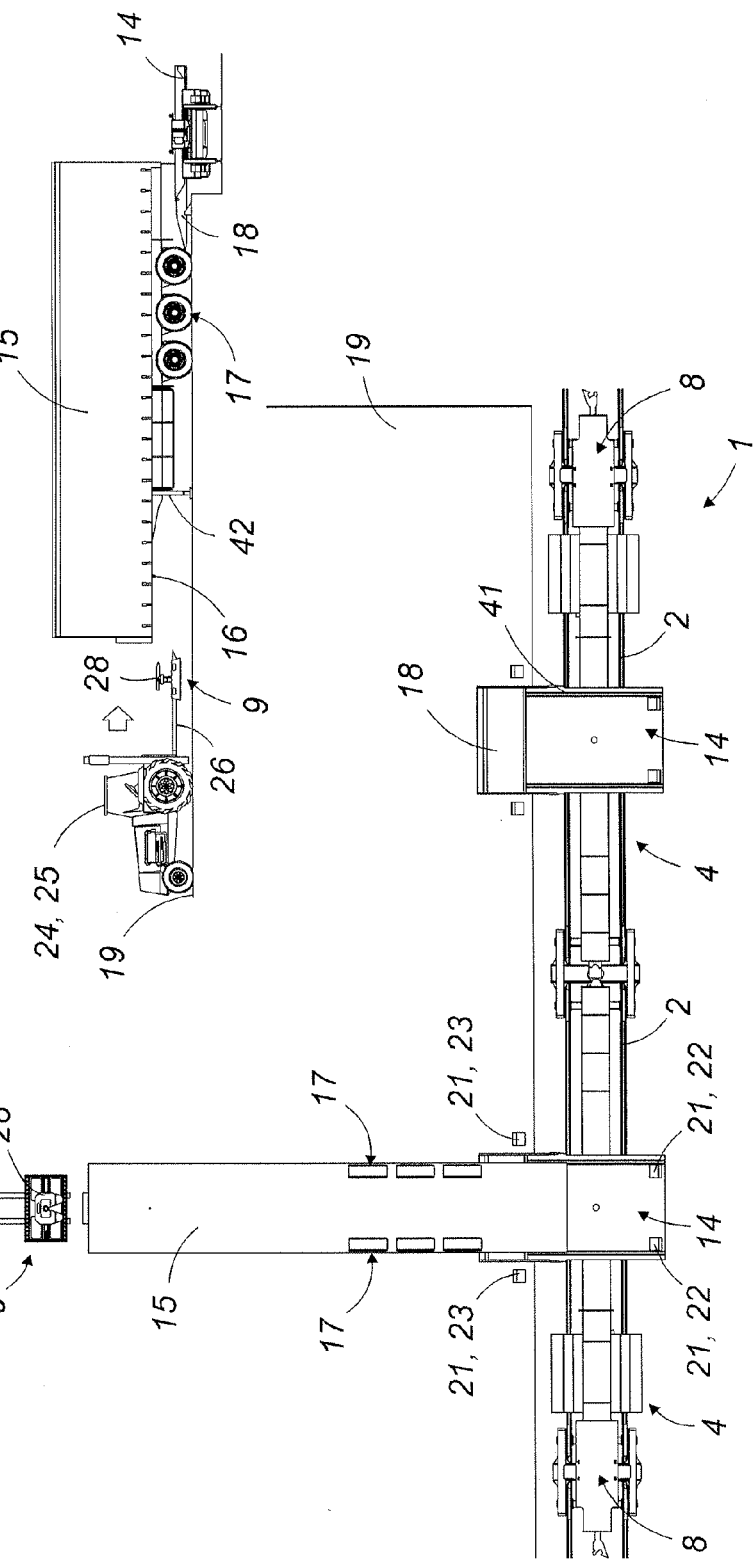
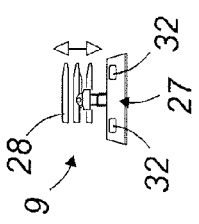
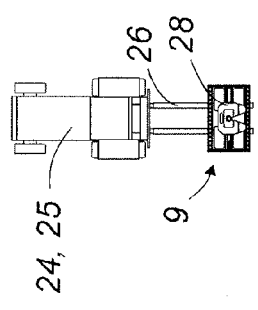
FIG.18
FIG.19
FIG.20

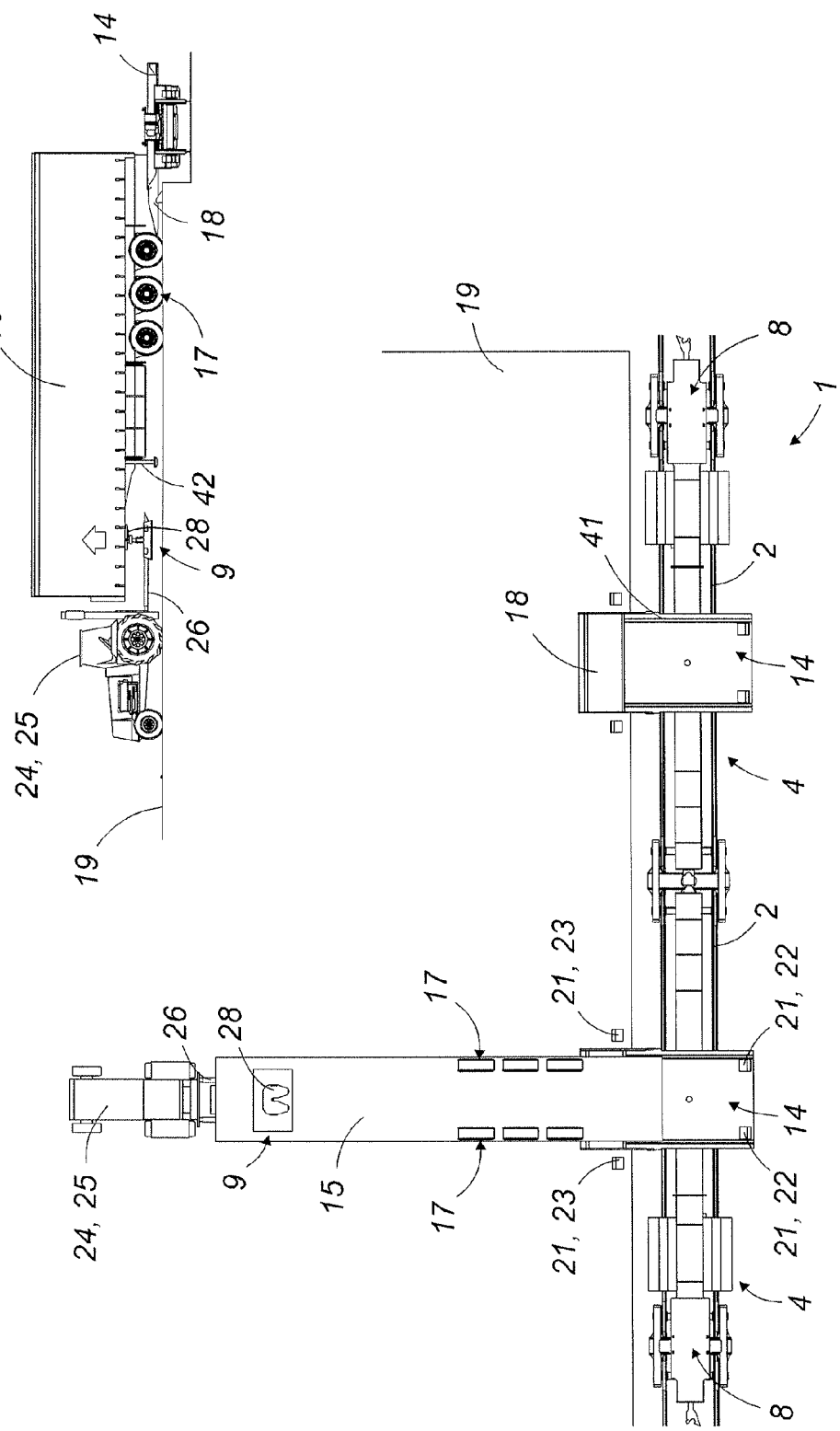

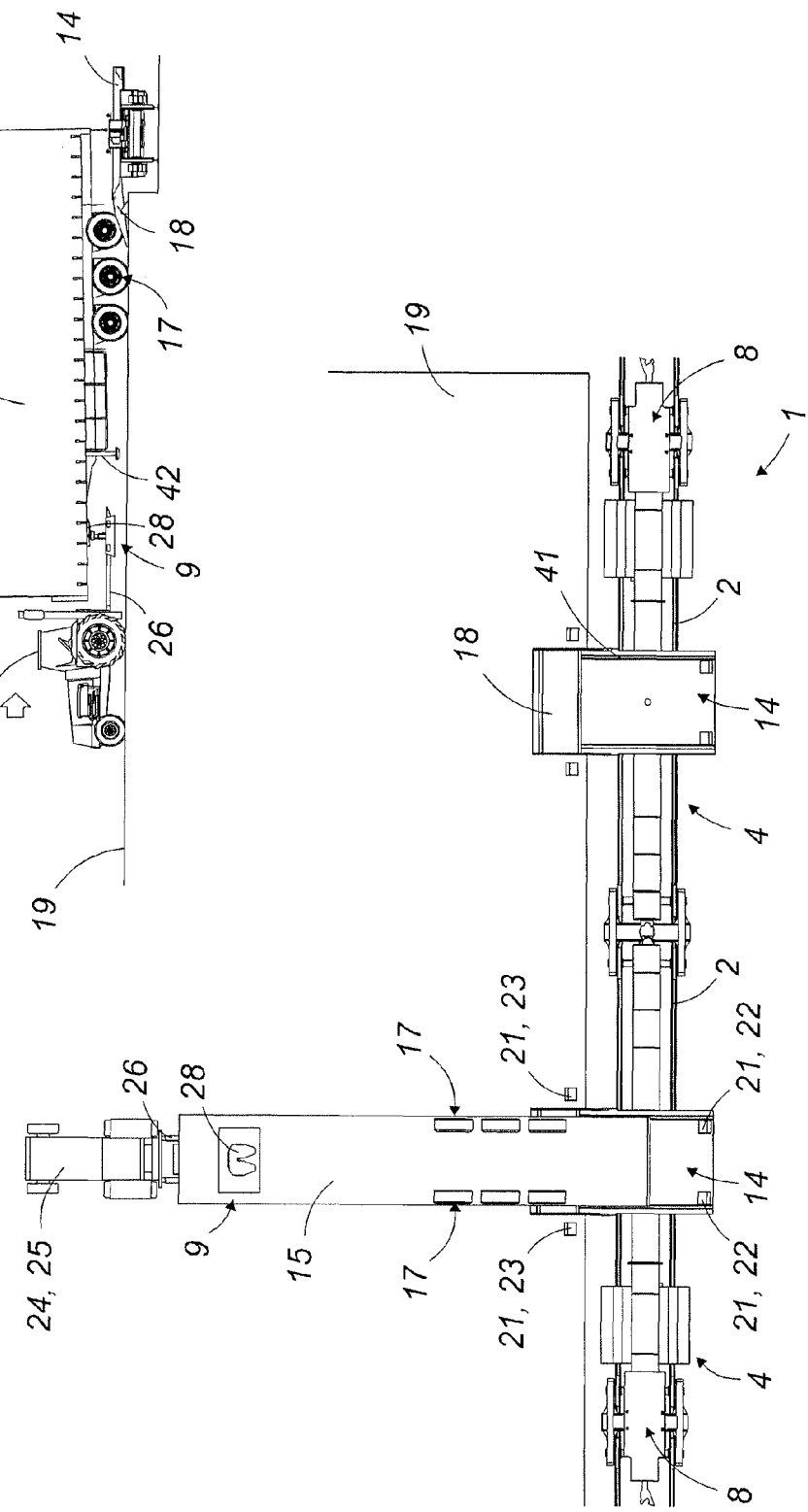

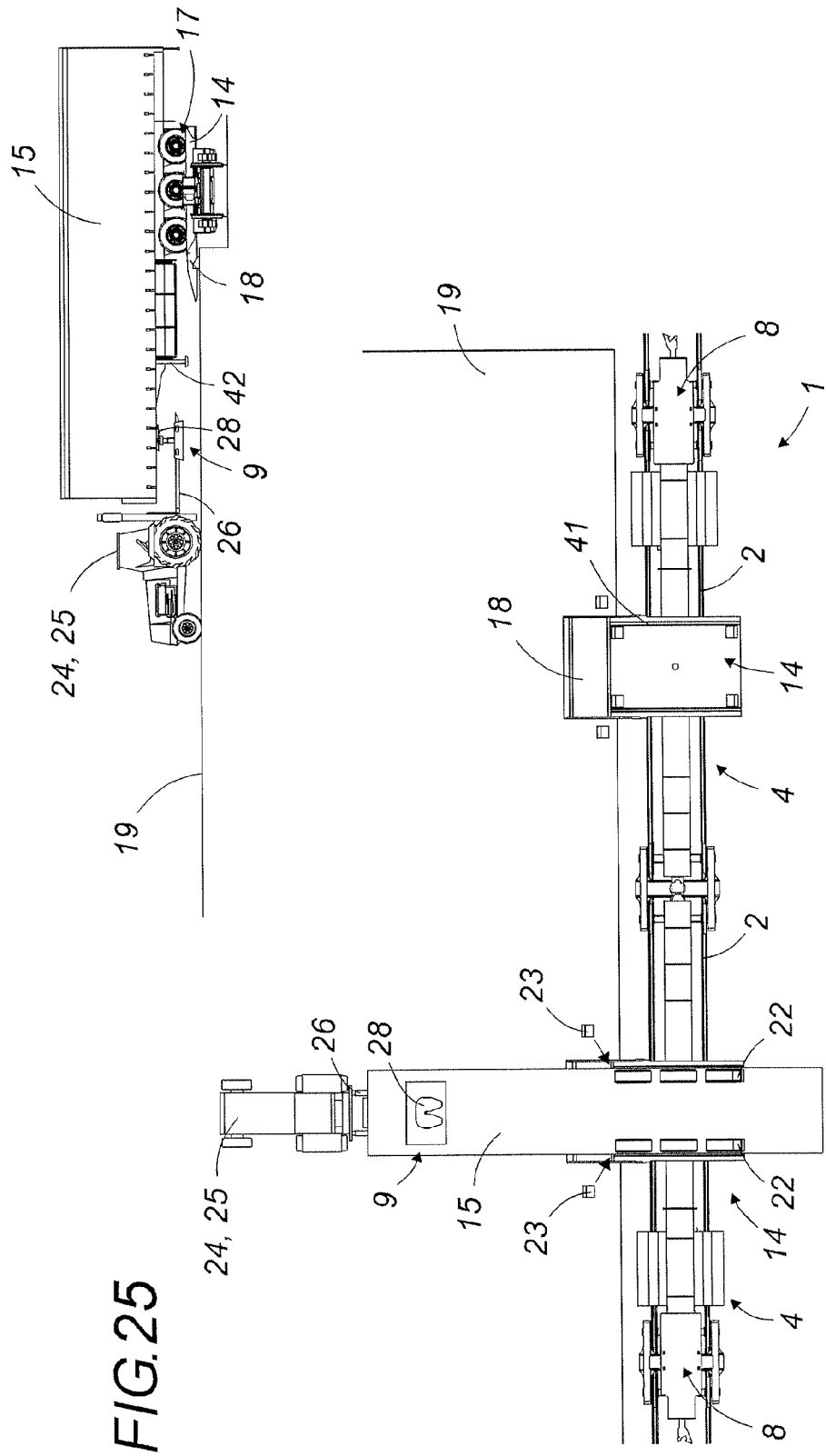

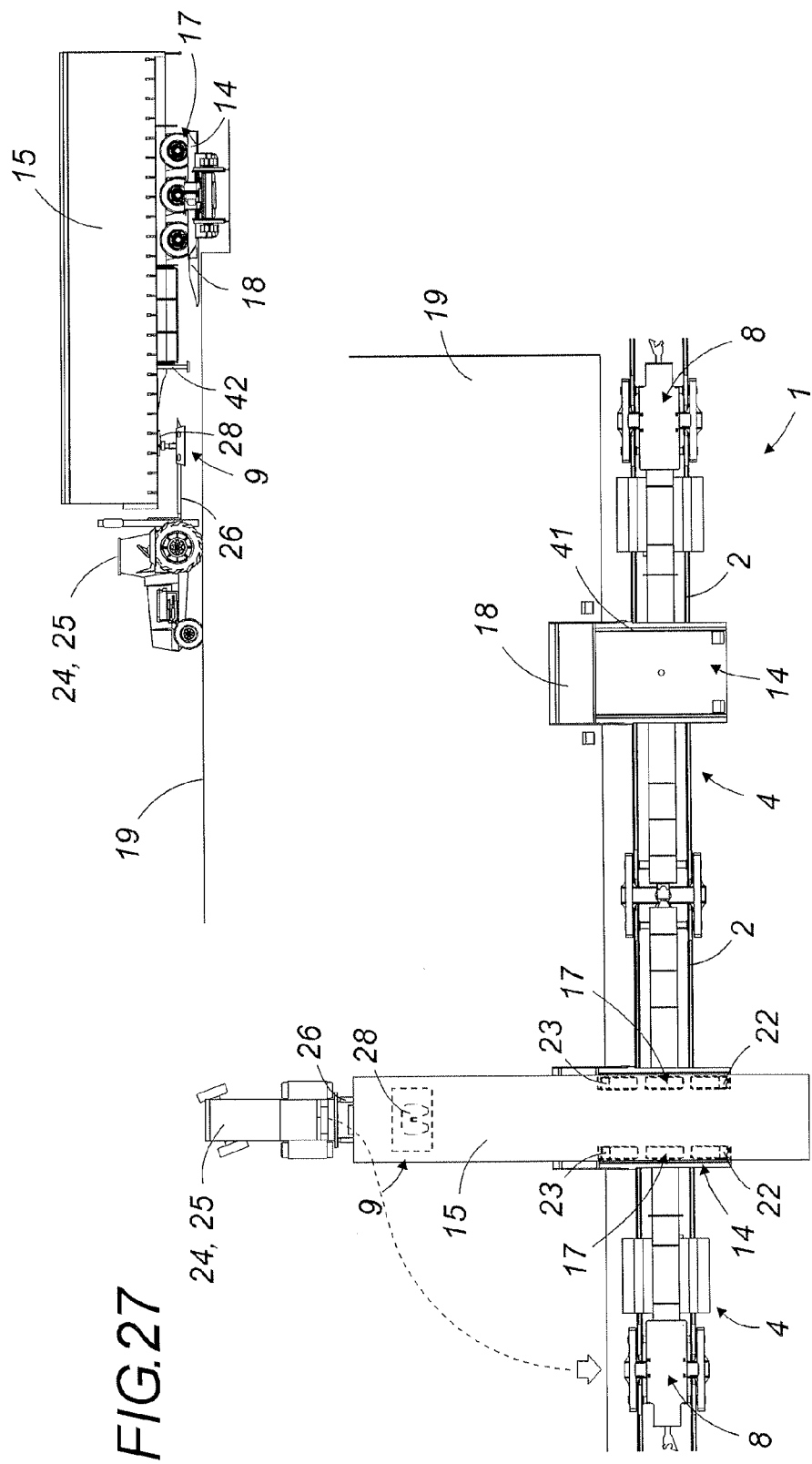

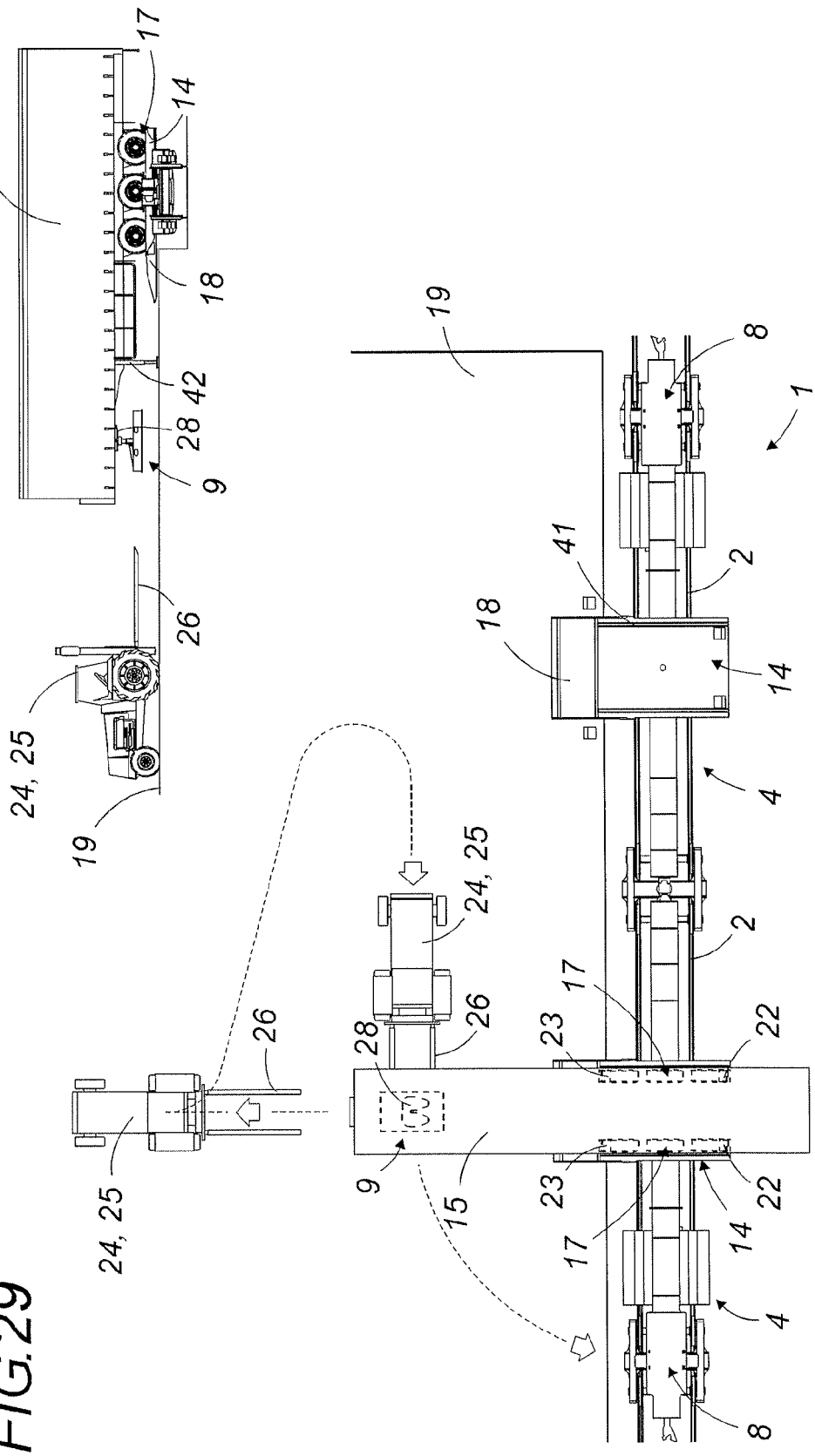

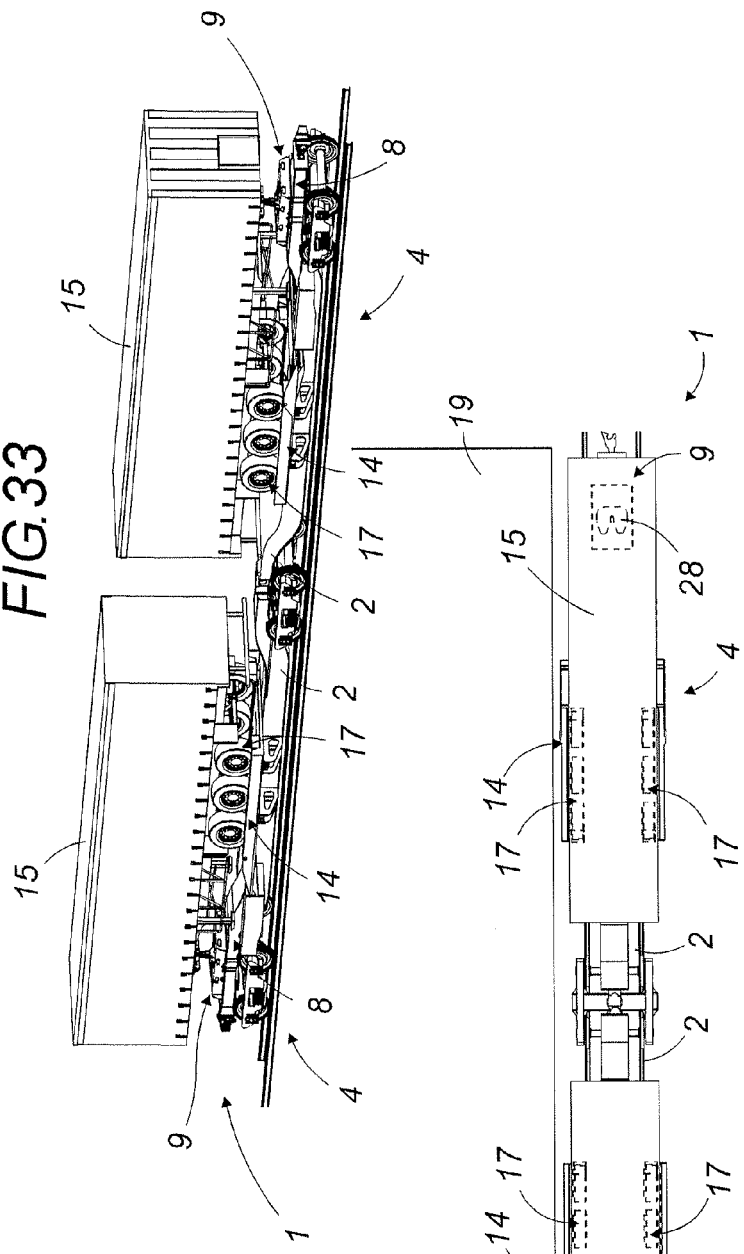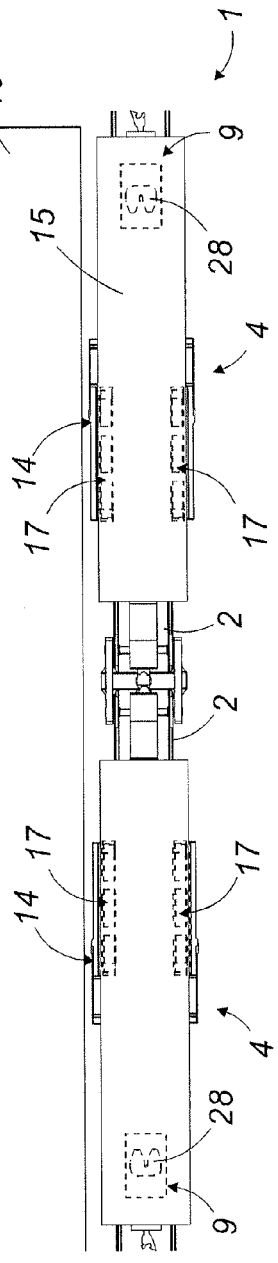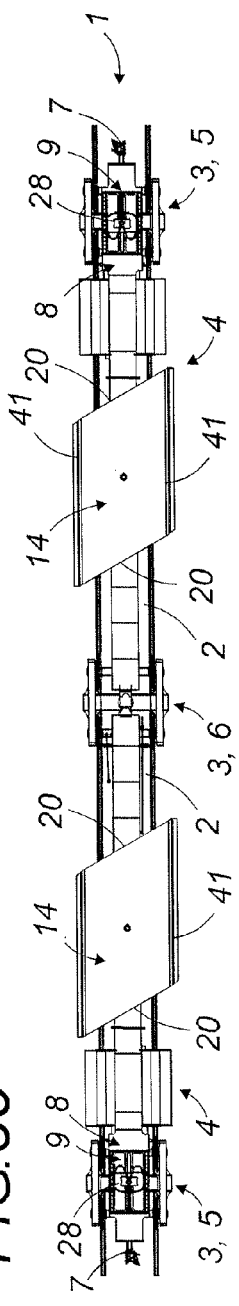

US 9,248,984 B2

UNIVERSAL SYSTEM FOR THE LOADING/UNLOADING AND RAIL TRANSPORT OF ROAD SEMITRAILERS

This application is a National Stage completion of PCT/IB2011/053322 filed Jul. 26, 2011, which claims priority from French patent application serial no. 10/03235 filed Jul. 30, 2010.

FIELD OF THE INVENTION

The present invention relates to a universal system for loading/unloading and rail transportation of road-hauled semi-trailers.

BACKGROUND OF THE INVENTION

To limit the size of roads and highways as well as the pollution generated by road transport, it is increasingly desired to expand the rail transportation of semi-trailers on specific wagons, and to transport them over long distances by rail rather than via the road network.

For this, semi-trailers must now be loaded and unloaded using different techniques in combined road and rail terminals specially equipped for performing such operations. Special and expensive infrastructure must be provided on railway platforms for the loading and unloading of these semi-trailers.

In addition, the trains used for such transportation are also very specific. They consist of specialized wagons for transporting this type of load and, in addition, must open so as to allow the loading and unloading of semi-trailers. These wagons are complex and also very expensive.

Various opening systems are known for these specialized wagons. One possible technique is to use wagons consisting of a rolling base and a bearing railway structure capable of being separated from its rolling base by pivoting; this pivoting can be central or can take place at one of its extremities.

Central pivoting provides the possibility of access or removal at one or other of the extremities, whereas pivoting around one of the extremities only leaves one end free for the entrance and exiting of semi-trailers before and after their transportation.

Other opening methods are also possible, such as—for example—sideways movement of the bearing railway structure.

All these systems have the disadvantage of being complex and expensive.

The specialized wagons have to be motorized and must be able to provide the energy required for their opening and closing movement while their bearing structure is loaded with semi-trailers. In addition, these specialized wagons must be equipped with additional specific trackside installations in specialized stations for the loading and unloading of semi-trailers.

All these necessary investments in wagons and trackside infrastructure explain the slow development of use of rail transport for semi-trailers, notwithstanding its desirability from the social, ecological, economic and political viewpoints.

Some systems of loading and unloading semi-trailers on to and from a wagon for rail transportation are already known.

First of all, there is U.S. Pat. No. 4,425,064 in the name of WALDA, concerning a turntable borne by the wagon and accommodating a semi-trailer's wheel assembly, and its securing to a mounting bearing a hitch.

This turntable pivots between a rolling position in which it is positioned within the longitudinal axis of the wagon, and a loading/unloading position in which it is rotated in relation to the wagon.

Towards the front, the wagon also comprises a platform bearing an articulated assembly composed of oblique arms articulated on the extremities, on which there is a semi-trailer hitch supporting the front of a semi-trailer by its kingpin. The articulated arms are conrods of which the inclination allows the hitch to change from a low resting position to a raised position for supporting the semi-trailer by its front section during its railway transportation.

While this invention does indeed include a pivoting bearing structure on the wagon, intended to accommodate the semi-trailer's wheel assembly, the hitch articulated on the elevation assembly is not detachable as for the present invention and, therefore, cannot be manipulated by a handling plant, and is not usable placed on the semi-trailer in view of adjustment and its installation on the wagon.

There is also the invention described in European patent EP no. 1712444 in the name of ARBEL FAUVET RAIL.

According to this patent, the semi-trailer is loaded into a load-bearing nacelle 4, and it is immobilized on it laterally by means of fastening systems 24 and 25 and, at the front, by means of the restraining system 6 of the coupling 7. The load-bearing nacelle 4 bears upon and is affixed to the long beams of the longitudinal edges of a wagon of the type referred to as a 'pocket wagon'.

The clamping system 6 of the coupling 7 is combined into a supporting system 1 that is detachable from the nacelle 4 via a longitudinal sliding movement at the end of its deck. This supporting system 1 comprises a hitch secured at the top, which interoperates with the semi-trailer's kingpin.

To be operational, the supporting system 1 has to be assembled at the front end of the nacelle. A controlling system allows one to adjust the hitch heightwise.

However, only the supporting system is removable with a simple longitudinal separating movement, and one can only adjust the height of the hitch when this supporting system is in place, which seriously complicates the operations of positioning and supporting the front of the semi-trailer, and of loading it on to and unloading it from the wagon.

Lastly, through the publication DE 3234375 in the name of WAGGON FABRIK TALBOT, another system is known for loading and unloading a semi-trailer on to or from a wagon of type 'pocket wagon' type. This system includes a tipping and pivoting platform that accommodates the semi-trailer's wheel assembly and immobilizes it through controlled sinking within the wagon. The semi-trailer's kingpin is engaged within an elevation assembly allowing one to lift the front of the semi-trailer so that it can be supported by a support platform. The elevation assembly comprises the equivalent of a hitch, but it is not detachable and is not used for positioning the semi-trailer on the wagon by means of a handling plant.

All the difficulties of manoeuvring the semi-trailer are experienced at the moment of and during its positioning on the wagon and its removal from it.

SUMMARY OF THE INVENTION

The purpose of the present invention is to provide a system for loading/unloading and rail transportation for semi-trailers that is much simpler and less costly than current systems.

The wagons used are of very simple construction and are preferably non-motorized. Thus, they are much less expensive than prior means.

The system according to the invention requires no specialized trackside platform, nor any special trackside installation. Any station or area with a trackside platform can be used to load and unload semi-trailers.

The system does not need to be motor-driven and, therefore, requires no energy source on the wagon or on the trackside platform for loading/unloading. Only a handling machine such as a forklift truck is necessary for the loading or unloading of semi-trailers, and for switching the system from its loading/unloading position to the transportation position, and vice versa; this handling plant is very commonplace and forms part of the basic equipment of all stations used for cargo and freight transportation.

The system is also universal, namely it can be used for any kind of semi-trailer, regardless of its type, model and length, provided that it has a wheel assembly at the rear and a kingpin at the front; the distance between them can be different, according to the country and the road regulations in force.

In addition, it allows easy and quick loading and unloading. This is because all the semi-trailers transported by the system according to the invention can be loaded or unloaded one after the other, or simultaneously in groups, or all together, in any order, depending on the users' preferences and/or the number of handling machines present.

To this end, the invention provides a universal system for loading/unloading and rail transportation of road-hauled semi-trailers, that includes at least one rail wagon forming part of a train, this wagon incorporating a chassis and designed to accommodate at least one road-hauled semi-trailer for its rail shipment, equipped with a kingpin at the front and a wheel assembly at the rear.

According to the invention, this wagon comprises:
at least one bearing turntable which pivots in relation to the chassis that is suitable for accommodating the semi-trailer's wheel assembly; this turntable pivots between a transportation position in which it is positioned longitudinally in relation to the wagon, and a loading/unloading position in which it is oriented transversely or obliquely with respect to the wagon; and
at least one accommodating platform to support the semi-trailer's kingpin; this accommodating platform is connected to or integrated with the chassis, being fixed in relation to it and being independent of the pivoting turntable.

The system according to the invention also comprises a detachable hitch attachment incorporating:
a body that can be gripped by a handling machine and which is assembled in a detachable manner on the wagon's accommodating platform; and
a hitch, preferably adjustable in height relative to the body, designed to accommodate and immobilize the semi-trailer's kingpin.

BRIEF DESCRIPTION OF THE DRAWINGS

Other features and advantages of the invention will be mentioned in the description which follows, provided by way of example, and the accompanying drawings, in which:

FIGS. 1 and 2 are respectively side and top plan views of a dual wagon with two pivoting turntables in the transportation position;

FIGS. 3 and 4 are respectively side and top plan views of a dual wagon with two pivoting turntables in the loading/unloading position;

FIGS. 8 to 11 are respectively top and side views illustrating the assembly of the semi-trailer on the turntable when it remains coupled to its road haulage tractor;

FIG. 12 is a schematic side view illustrating the hitch attachment, illustrating the phase of height adjustment of the hitch;

FIG. 13 is a side view of the semi-trailer loaded on to a turntable, with its legs bearing on the trackside loading platform;

FIGS. 14 to 16 are top views of the system, illustrating the phases of installation of the hitch, pivoting of the turntable and mounting of the hitch attachment on the corresponding accommodating platform of the wagon, all of which is done with a forklift truck;

FIG. 17 is a side view of the trackside platform, showing the positioning of the hitch attachment on the corresponding accommodating platform of the wagon;

FIG. 18 is a schematic side view illustrating the hitch attachment, showing the phase of height adjustment of the hitch;

FIGS. 19 to 32 are pairs of views, respectively from above and the side, of the system according to the invention in the various stages of loading with a forklift truck, in the scenario in which the road haulage tractor does not assemble the semi-trailer on the turntable; FIGS. 29 and 30 represent an alternative variant to FIGS. 27 and 28;

FIGS. 33 and 34 are views respectively in perspective and from above, showing the wagon loaded with two semi-trailers and ready for departure;

FIG. 35 is a top view showing a wagon with pivoting accommodating plates with oblique transversal rims;

DETAILED DESCRIPTION OF THE PREFERRED EMBODIMENTS

Figure 5:
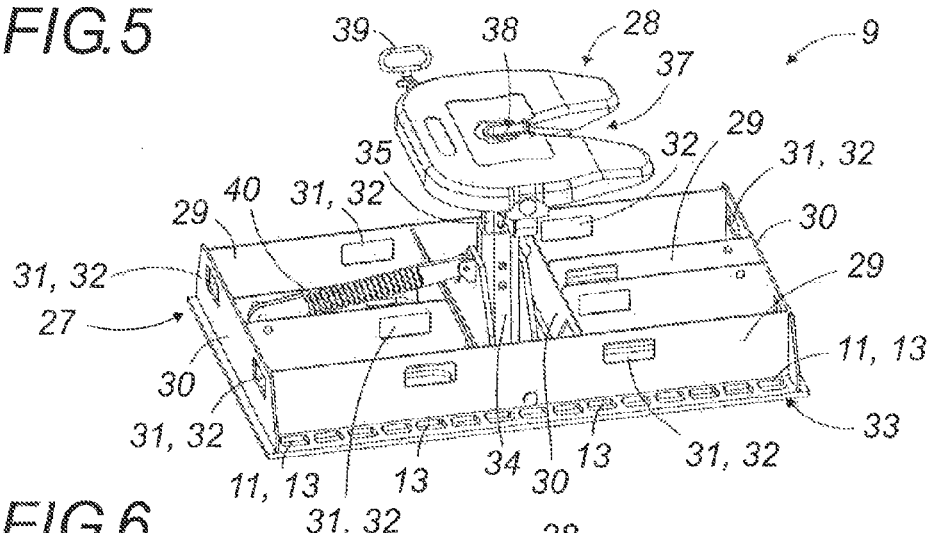
FIGS. 5 to 7 are views of the hitch attachment, with:
for FIG. 5, a perspective view in isolation;
for FIG. 6, a side view as when assembled on an accommodating platform connected to the wagon chassis;
for FIG. 7, a top view as when assembled on an accommodating platform connected to the wagon chassis.
Figure 6:
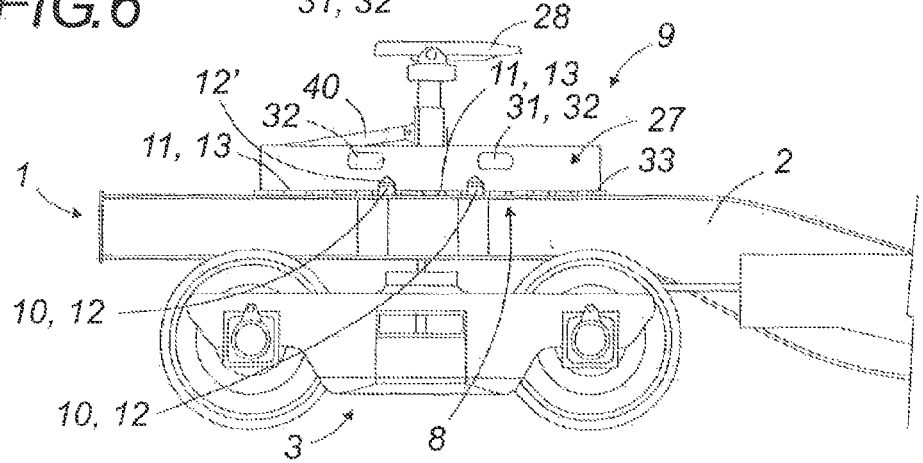
Figure 7:
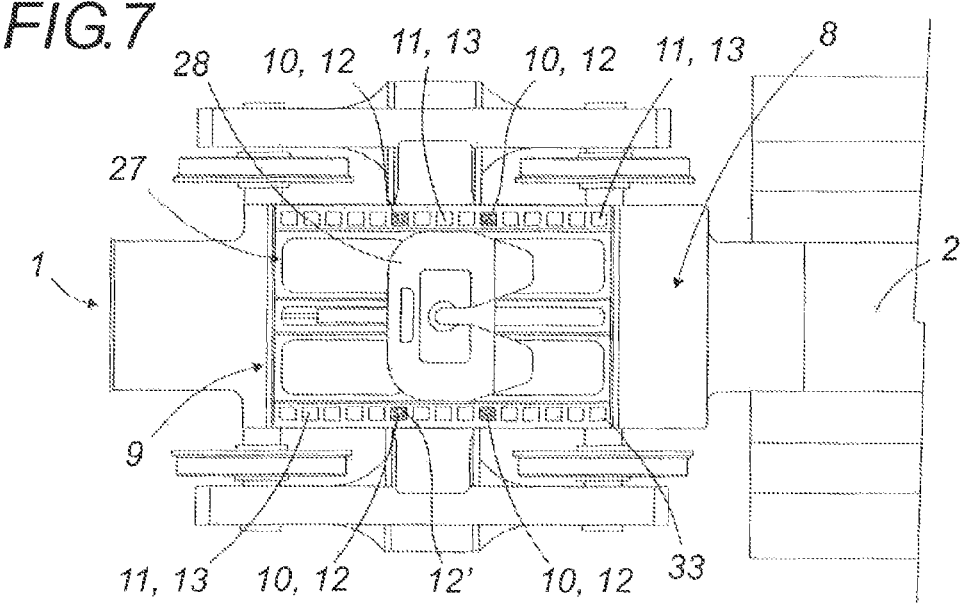

The system according to the present invention will now be described in detail, with reference to FIGS. 1 to 38. Equivalent items shown in the various figures are assigned the same reference numerals.

The basic version of the universal system for loading/unloading and rail transportation of semi-trailers according to the invention comprises simple wagons 1 composed of a chassis 2, preferably flat and lowered, of which this chassis is supported at each of its extremities by an end wheel assembly known as a bogie 3.

The transportation system according to the present invention can also employ dual wagons 1, such as those illustrated in the figures, each of which is formed by the combination of two basic wagons 4. These dual wagons 1 then incorporate several types of bogies 3: two end bogies 5 and one common intermediate bogie 6 that provide a median rolling bearing point between the basic wagons 4 positioned front to back.

The dual wagons have the important advantage of being able to carry two road haulage loads on one railway wagon. However, the invention applies to any type of railway wagon 1, provided that it comprises a chassis 2 capable of carrying one or more semi-trailers and of bearing all the stresses generated by their transportation.

In the embodiment shown, each basic wagon 4 comprises a chassis 2—preferably flat and lowered—assembled at one of its ends on the intermediate bogie 6 and, at its other end, assembled on the corresponding end bogie 5. The two extremities of the dual wagon 1 are terminated by rail buffers and, in each case, a coupling hook 7.

The wagons each incorporate—preferably near the end bogies 5—an accommodating platform 8 that is fixed in relation to the chassis 2, which constitutes one of the principal features of the loading and transportation system according to the invention. This accommodating platform 8 is designed to accommodate and bear a hitch attachment 9, which is also another essential feature of the invention and which, as will be understood further on, is assembled in a detachable manner on the accommodating platform 8 during the loading of a semi-trailer, remains in place during its transportation, and is removed when unloading the semi-trailer.

For this, the accommodating platform 8 includes an immobilization system 10 that interoperates with the complementary immobilization system 11 borne by the hitch attachment 9.

The immobilization system 10 of the platform can be of any type provided that it allows, in association with the complementary immobilization system 11 of the hitch attachment 9, detachable securing and temporary restraining of the hitch support 9 on the accommodating platform 8. The system can be fixed or detachable or articulated.

For example, It may be lugs 12, pins, projections, fingers, hooks or other protruding elements interoperating with openings 13, rings, hollows or cavities of whatever design held by the hitch attachment 9.

Conversely, the immobilization system 10 of the accommodating platform 8 can be openings, rings, hollows or cavities of whatever design that interoperate with lugs, pins, projections, fingers, hooks or other protruding elements of the hitch attachment 9.

These immobilization systems 10 and 11 are preferably supplemented by temporary locking systems that are separate from or incorporated within these immobilization systems such as, for example, rotating or latch-based locks—notably the twistlock type used for securing ISO containers.

Any other appropriate means of temporary immobilization of the hitch attachment 9 on the accommodating platform 8 of the wagon 1 can be considered.

Assembled on the chassis 2 of each basic wagon 4, there is a pivoting turntable 14. This pivoting turntable 14 allows the corresponding accommodating platform 8 to accommodate and bear a road-hauled semi-trailer 15, of which the system according to the invention allows loading, transportation and unloading.

The system according to the invention is universal; it is suitable for any type of semi-trailer 15 regardless of its type, model and length, provided that it has a kingpin 16 at the front and a wheel assembly 17 at the back—with three axles, for example.

The pivoting turntables 14 are each assembled so as to pivot freely or driven by a motor on the chassis 2, by suitable systems involving, for instance, a central pivoting pin with, possibly, the assistance of bearing rollers on a crown, jockey wheels, roller bearings or any other equivalent system that is of commonplace technology and that, consequently, will not be described herein.

The pivoting turntables 14 can be oriented by pivoting—preferably manually or possibly motor-driven—between two characteristic positions: one transportation position (FIG. 2) in which they are aligned along the longitudinal axis of the wagon, and a loading or unloading position (FIG. 4) in which they are perpendicular to the longitudinal axis of the wagon or obliquely positioned in relation to it.

The pivoting turntables 14 are preferably immobilized in these two characteristic positions by any suitable locking system—for example, mechanical, pneumatic or hydraulic—preferably manually.

The pivoting turntables 14 are preferably considerably shorter than the chassis 2 on which they are assembled, this length preferably being slightly greater than that of the wheel assembly 17 of the semi-trailers 15.

In the transportation position, the pivoting turntables 14 do not support the entire corresponding semi-trailer, only its rear portion by means of its wheel assembly 17, the front part of the semi-trailer 15 being supported by the accommodating platform 8 via the kingpin 16, which is immobilized within the hitch attachment 9.

One feature of the system according to the invention is that the accommodating platform 8 is connected to the chassis, and is independent of the pivoting turntable 14. Thus, the semi-trailer 15 is directly locked to the chassis 2 of the wagon 1, via its kingpin 16. In addition, the pivoting of the pivoting turntable 14 is also locked by this arrangement.

The pivoting turntable 14 may incorporate, at one of its ends, an access ramp such as 18, consisting—for example—of a retractable end plate assembled with elastic return to the upper position, as illustrated in the figures. This access ramp 18 ensures a continuous transition between the rolling surface constituted by the trackside loading platform 19 and the turntable 14 accommodating the wheels of the semi-trailer 15.

In the event that there are two trackside loading/unloading platforms 19 on either side of the railway track on which the semi-trailer 15 transportation wagon 1 is located, the pivoting turntable 14 may be required to cross over to the road haulage tractor of the semi-trailer 15, and transferred from one trackside platform to the other, so as to be able to load the semi-trailer 15 in forward travel on to the pivoting turntable 14.

In this case, the pivoting turntable 14 will preferably be equipped with two access ramps 18—with one at each of its extremities—so as to provide a continuous transition with each of the trackside loading platforms 19 on each side of the railway line.

As a variant, this retractable access ramp 18 can be replaced by an end extension—an articulated or telescopic appliance, for example—or simply by the extremity of the pivoting turntable 14. This extension can swing so as to have a raised or retracted resting position.

This extension is intended to obtain the same level between the rolling surface of the trackside loading platform 19 and the bearing surface of the corresponding pivoting turntable 14; the transversal edge 20 of the extremity of the turntable 14 or its extension should be—in the turntables loading/unloading position —sufficiently close to the edge of the trackside platform for the gap existing between the two to be easily crossable by the semi-trailer 15.

To facilitate the pivoting of the pivoting turntable 14 when this extremity or end extension is fixed, it is possible to, for example, incorporate a localised curved concave hollow within the structure of the trackside loading platform 19, opposite this extremity, and a curved convex extremity in the turntable 14, so as to allow clearance at the corners during the pivoting of the pivoting turntable 14 in order to change between one or other of its characteristic positions.

It is also possible to use pivoting turntables 14 with oblique transversal edges, such as in the variant illustrated in FIGS. 35 to 38. Obviously, this implementation is preferable to the preceding arrangement, because it does not involve modifying the structure of the trackside loading platforms 19.

The pivoting turntables 14 preferably incorporate a set of four shims 21—with two rear shims 22 and two forward shims 23—that immobilize the end wheels of the semi-trailer's 15 wheel assembly 17 when it has been loaded on to the pivoting turntable 14.

In the event that the pivoting turntable 14 is only accessible by one of its transversal edges 20, which requires loading the semi-trailer 15 in reverse, the rear shims 22 can be fixed in relation to the turntable 14. They can be assembled in a fixed manner on to the pivoting turntable 14, or can be directly integral to it. However, the forward shims 23 must be moveable or detachable, so as to provide clear passageway on the pivoting turntable 14 during the phases of loading and unloading of the semi-trailer 15, as will be seen subsequently.

In the event that the pivoting turntable 14 is accessible by each of its transversal edges 20, thereby making it possible to cross the turntable and load the semi-trailer 15 in forward, all the shims 21—namely the rear shims 22 and the front shims 23—are moveable or detachable so as to leave the pivoting turntable 14 completely free for the phases of loading and unloading of the semi-trailer 15.

Of course, any other suitable means of immobilizing the wheel assembly 17 of the semi-trailer 15 can be considered.

A solution without shims can also be considered; in this case, the semi-trailer 15 is immobilized only by its kingpin 16. The turntables 14 then preferably have lateral edges enabling proper centering of the semi-trailer 15. These edges are also used to restrain the semi-trailer 15 when lateral stresses are exerted during rail transportation.

In another more sophisticated version, the locking of the semi-trailer's 15 wheel assembly 17 can be done automatically—for example, when the pivoting turntable 14 is immobilized in the transportation position.

One of the important features of the semi-trailer rail transportation system according to the present invention is the hitch attachment 9. It is shown in more detail in FIGS. 5 to 7.

It is a bearing support that provides support for the front of the semi-trailer 15 during the loading and unloading phases, with the assistance of a machine—notably a moving handling appliance 24, such as a forklift truck 25 with forks for gripping 26—but also during rail transportation when it is placed on the accommodating platform 8 connected to the chassis 2 of the wagon 1.

As such, this hitch attachment 9 constitutes the interface, firstly between the semi-trailer 15 and the handling machine 24 during the loading and unloading phases and, secondly, between the semi-trailer 15 and the wagon 1 during rail transportation.

It generally consists of a body 27, which is assembled in a detachable manner on the accommodating platform 8 of the wagon 1, and, preferably, a hitch 28 designed to accommodate and immobilize the kingpin 16 of the semi-trailer 15, with any other system of locking of the kingpin 16 of the semi-trailer 15 also being possible.

The body 27 takes the form of a mechanical base composed, for example, of a frame structure or of exterior and interior longitudinal 29 and transversal 30 plates.

The body 27 is advantageously grippable by a handling machine 24. For this, it has a mechanical interface system 31 compatible with the gripping system of this machine. In the illustrated variant, it is, for example, a series of apertures 32 arranged in alignment within the longitudinal 29 and/or transversal 30 plates of the body 27, so as to leave the interior space free for the insertion of the fork(s) 26 of the forklift truck 25.

Depending on the variant and the layout of these openings 32, the apertures can be transversal or longitudinal or both at the same time, as can be seen in the example in FIG. 5. In the latter case, the forklift truck 25 can advantageously take up the hitch attachment 9 via any of its faces, and employ it, according to wishes, for transversal or longitudinal presentation.

However, other handling machines 24 can be used, such as a port crane or other lifting appliance of crane or beam type, for example. The mechanical interface system 31 can be different, according to the type of handling machinery used. For a crane, for example, the openings 32 providing apertures for the arms of the fork 26 of the forklift truck 25 can be replaced, for example, by attachment rings for slings. Different mechanical interface systems 31 can advantageously coexist on the body 27 of the hitch attachment 9, to make it compatible with various types of handling plant.

As previously mentioned, the body 27 of the hitch attachment 9 also comprises an immobilization system 11 complementary to the system 10 on the accommodating platform 8 of the wagon.

In the variant illustrated, the complementary immobilization system 11 is composed of perforated section bars 33, along the longitudinal edges or longitudinal plates 29 of the body 27, with each having a series of openings 13—square, for example—that fit into each other or that are entered by the pins or lugs 12—four, for example—existing on the accommodating platform 8 connected to the chassis 2 of the wagon 1.

The multitude of openings 13 present on the perforated section bars 33 compensate for the differences of distance that might exist, depending on the model of semi-trailer, between the kingpin 16 and the wheel assembly 17 of the semi-trailer 15. Regardless of the distance and, therefore, regardless of the position of the hitch attachment 9 assembled on the kingpin 16 of the semi-trailer 15, there are openings 13 that are substantially in opposition and that can be entered by the lugs 12 of the accommodating platform 8 when the pivoting turntable 14 is in the transportation position. As such, the assembly of the hitch attachment 9 on to the wagon's accommodating platform 8 is always possible.

These perforated section bars 33 could also be provided along the transversal edges or transversal plates 30 of the body 27, so as to make it possible, in a symmetrical configuration of the body 27, to assemble the hitch attachment 9 on the wagon's accommodating platform 8, regardless of the direction of presentation of the hitch attachment 9 by the handling machine 24.

On the body 27 of the hitch attachment 9 and, preferably, substantially in its center, a shaft 34 is assembled, telescopically extended by an end section 35 on the free extremity, on which the hitch wheel 28 is assembled pivotally. The pivoting of the hitch 28 is limited to pivoting around a horizontal axis, namely parallel to the base plane of the body 27 of the hitch attachment, and perpendicular to the direction of travel. Thus, the hitch is free in pitch but impeded in roll. In this way, the semi-trailer 15 is maintained with regard to roll when positioned on the wagon 1.

The technical form of the hitch 28 is intended to be compatible with the kingpin 16 of the semi-trailers 15 to be loaded, and it is generally a standardized hitch 28. This hitch 28 is equivalent to those existing on the road haulage tractors 36 to which the semi-trailers 15 to be transported are coupled.

It comprises a convergent entry 37, a slot 38 for the kingpin 16, and a locking system for the said kingpin that can be released via actuating handle 39.

Locking the kingpin 16 into the hitch 28 is conventionally accomplished by longitudinal engagement of the hitch 28 around the kingpin 16, until it is located in the slot 38, this engagement being facilitated by the convergent form of the entry 37. The locking of the kingpin 16 is then automatic. When the kingpin 16 is locked into the hitch 28, all its movements in relation to the hitch 28 in the three directions are blocked. Therefore, the orientation of the hitch 28, as seen from above, is unimportant.

The hitch 28 is preferably assembled so as to be adjustable heightwise in relation to the body 27 of the hitch attachment 9. For this, the end section 35 is assembled so as to slide telescopically within the shaft 34, to allow heightwise adjustment of the hitch 28 in relation to the body 27. Immobilization in a given position is achieved by any suitable means: clamping, pinning as illustrated, or whatever other system.

This height adjustment mechanism can be designed to be operated by an operator, or by a change in the height of the fork 26 of the forklift truck 25, or any other equivalent facility of the handling machine 24 used.

Other systems of heightwise adjustment are also possible—at the accommodating platform 8, for example.

In one basic version, insofar as the gauge allows or if, for example, the height of the kingpins 16 of the semi-trailers 15 is constant, this height adjustment feature can be eliminated.

This mechanism is automatically locked to take up all the vertical forces caused by the semi-trailer 15. As such, the kingpin 16 held by the hitch 28 is immobilized in all directions.

To ensure a damping function with respect to longitudinal shocks that can occur during rail transportation, and also to provide the deflection necessary to absorb the adjustments due to the positioning of the semi-trailer 15 on the wagon 1, the shaft 34 is preferably mechanically secured on to the body 27 by means of an oblique arcing 40—for example, implemented by a cylinder, a spring or any similar means, with mechanical elastic return or other means of return of the shaft 34 supporting the hitch 28 towards the center, namely to an straight vertical position.

A basic version without the capability of longitudinal deflection of the hitch 28 is also possible, especially in the event that the wheel assembly 17 of the semi-trailer 15 is not bearing against shims 21.

Obviously, other forms of hitch attachment 9 are possible. The advantage is that they should be grippable by a handling machine 24, particularly a machine with forks 26. The appliance taken as an example henceforth in this description is a mobile machine of forklift truck type 25, having a fork-based gripping device 26 assembled on one of its extremities, which is known for the handling and manipulation of pallets and containers.

Elaborating on the same inventive principle, one could envision employing pivoting turntables 14 with oblique transversal edges 20, so that one can load and unload semi-trailers 15 on either side, from two trackside loading and unloading platforms separated by the railway track on which the wagon 1 for transportation of the semi-trailers is positioned, preferably using the road haulage tractor 36 of the semi-trailer 15 to be loaded.

This possibility is illustrated in FIGS. 35 to 38.

Figure 36:
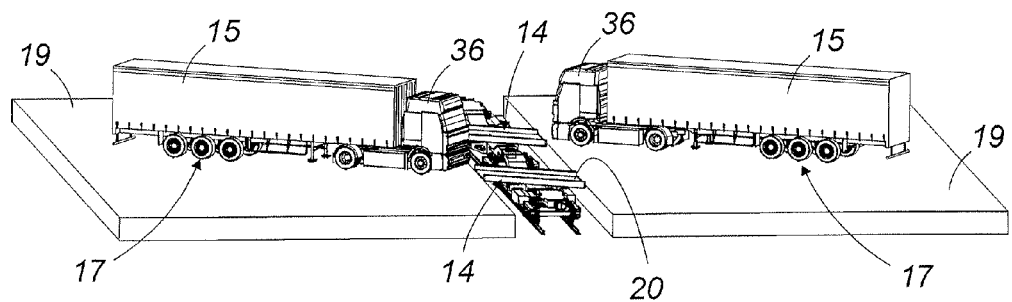
FIGS. 36 to 38 are schematic perspective views respectively showing the arrival of two semi-trailers in front of two pivoting turntables in oblique loading position, the loading of the semi-trailers on to these turntables by means of their road haulage tractor, and the departure of the road haulage tractor from the semi-trailers on the pivoting turntables.
Figure 37:
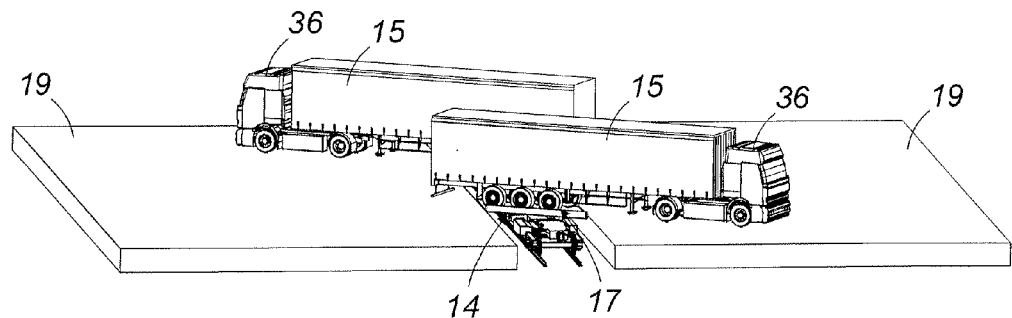
Figure 38:
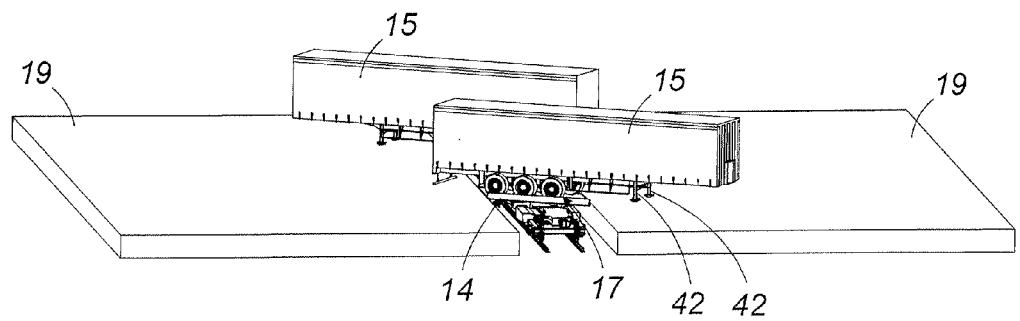

These oblique transversal edges 20 allow one to pivot the turntable 14 in the direction of clearance of the corner furthest from the adjacent edge of the trackside platform 19, without it coming into contact with this edge. This element facilitates oblique loading with transition of the road haulage tractor 36 of the semi-trailer 15 on to the pivoting turntable, above the railway track, from one trackside platform to the other, as can be seen in FIGS. 36 and 37.

In all cases, when the semi-trailer is loaded on the wagon 1 in rail transportation position, it rests on its wheel assembly 17, preferably restrained laterally by the lateral edges 41 of the pivoting turntable 14, bearing against the hitch 28 via its kingpin 16. Vertical, longitudinal and lateral movement of the kingpin 16 is restrained by the hitch 28, which is itself immobilized on the chassis 2 by means of the accommodating platform 8—for example, by means of lugs 12. An additional immobilization can be applied if the semi-trailer 15 is chocked at its wheel assembly 17 by shims 21.

A description of the positioning of a semi-trailer 15 on a dual wagon 1 now follows, supported by the accompanying FIGS. 8 to 34 in the scope of the transportation system according to the invention.

This load positioning can be done either by using the road haulage tractor 36 of the semi-trailer 15 to place it on the pivoting turntable 14 from a trackside platform 19, or by immediate use of the forklift truck 25 and the hitch attachment 9, working from the same trackside platform 19.

These two possibilities are considered in the description below.

Firstly, the initial loading phase is examined, which is carried out using the road haulage tractor 36 of the semi-trailer 15. This method, which is illustrated in FIGS. 8 to 17, is preferred. However, it requires the presence of the wagon 1. If the intention is to prepare the loading of the wagon 1, the second solution illustrated in FIGS. 18 to 32 will be preferable.

The semi-trailer 15 is moved, by means of its road haulage tractor 36, on to the trackside loading platform 19, in reverse position, opposite the pivoting turntable 14, which has been pivoted so that it is in loading position, perpendicular to the longitudinal axis of the wagon and the platform edge (FIGS. 8 and 9), or is oriented obliquely at an angle chosen by the operator—to optimize the footprint, for example. The access ramp 18 preferably provides the connection between the trackside loading platform 19 and the corresponding pivoting turntable 14. In this position, the pivoting turntable 14 is immobilized in relation to the chassis 2 of the wagon 1.

The road haulage tractor 36 pushes the semi-trailer 15 in reverse as far as its final position on the pivoting turntable 14. In this position, the wheel assembly 17 of the semi-trailer 15 notably occupies the entire length of the pivoting turntable 14, and the rear wheels of the wheel assembly are immobilized by the fixed rear shims 22. The forward shims 23 are then positioned so as to immobilize the front wheels of the wheel assembly 17 (FIGS. 10 and 11).

The road haulage tractor 36 then leaves the semi-trailer 15 in this position, after releasing the legs 42 (FIG. 13), and deflates the semi-trailer's 15 pneumatic suspension, The electrical and pneumatic connections between the road haulage tractor 36 and the semi-trailer 15 are also disconnected. As such, the semi-trailer 15 is automatically braked.

If there is a pivoting turntable 14 that crosses in relation to the two opposing edges of two trackside platforms 19, one can envision using the semi-trailer's road haulage tractor 36 in forward travel, so as to position it on the pivoting turntable 14.

In the above cases, the advantage of conserving the pneumatic and electrical connection between the road haulage tractor 36 and the semi-trailer 15, until the entry of the semi-trailer 15 on to the pivoting turntable 14 is maintained. For loading by forklift truck 25 (second loading method described below), the hoses have to be reconnected to the forklift truck 25, in order to release the brakes of the semi-trailer so that one can move it. One of the advantages of this first method is that one only has to perform these operations once.

The forklift truck 25 with forks 26 and the hitch attachment 9 are then employed. After adjusting—if necessary—the height of the hitch 28 (FIG. 12) in relation to the placement surface of the semi-trailer 15 on to the wagon 1, so that the semi-trailer 15 is perfectly horizontal in rail transportation position, the forklift truck 25 assembles the hitch 28 on the kingpin 16 of the semi-trailer 15 (FIG. 14). It is also possible to adjust the height of the hitch 28 by means of the fork(s) 26 of the forklift truck 25, after placement of the hitch attachment 9 on the kingpin 16.

The forklift truck 25 then pushes the hitch attachment 9, pivoting it 90°, so as to pivot the pivoting turntable 14 and place it in the transportation position, aligned within the longitudinal axis of the wagon 1 (FIGS. 15 and 16).

To achieve this, the front of the semi-trailer 15 is raised slightly to release the legs 42, and then lowered when the hitch attachment 9 arrives above the corresponding accommodating platform 8 (FIG. 17).

Loading with only the forklift truck 25—which is the second method of loading—is illustrated in FIGS. 18 to 32.

As previously, the hitch 28 is adjusted in height, if necessary, in relation to the body 27 of the hitch attachment 9, to ensure the horizontality of the semi-trailer 15 in the rail transportation position—this adjustment can be done before or after locking the hitch 28 on to the kingpin 16.

The forklift truck 25 takes hold of the hitch attachment 9 by means of its fork 26, and approaches the semi-trailer 15, so as to present and then connect the hitch to the kingpin 16 (FIGS. 19 to 22).

After pneumatically and—if necessary—electrically connecting the forklift truck to the semi-trailer 15 to release its brakes, the forklift truck 25 lifts the front of the semi-trailer 15 so as to retract the legs 42, and pushes it backwards on to the pivoting turntable 14 (FIGS. 23 to 26), until it comes into contact with the rear fixed shims 22. One then positions the detachable forward shims 23, and then the forklift truck 25 performs a rearward movement to cause the semi-trailer 15 and the pivoting turntable 14 to pivot into the longitudinal axis of the wagon 1 (FIGS. 27 and 28). This manoeuvre involves a path following the dotted line and the arrow illustrated in FIG. 27.

A variant manoeuvre is shown in FIGS. 29 and 30. This involves a disengagement of the forks 26 of the forklift truck 25, and their subsequent re-engagement in a different position, offset by 90° in relation to the body 27 of the hitch attachment 9 (FIGS. 29 and 30). After placement of the hitch 28 and the positioning of the semi-trailer 15 on the pivoting turntable 14 by means of a rearward movement of the forklift truck 25 as above, the forklift truck 25 is moved into a pushing position in which it is perpendicular to the front of the semi-trailer 15. From this position, the forklift truck 25 pivots the semi-trailer 15 by 90°, until it is aligned with the longitudinal axis of the wagon 1, following a path illustrated in FIG. 29 by two dotted lines.

Figure 32:
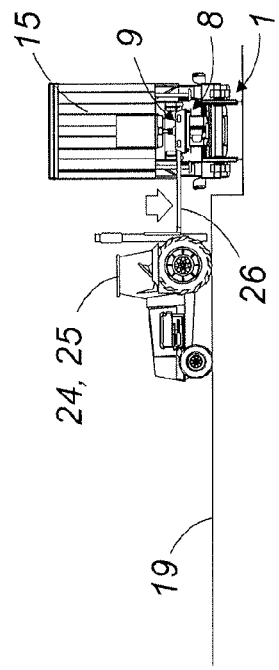
Figure 31:
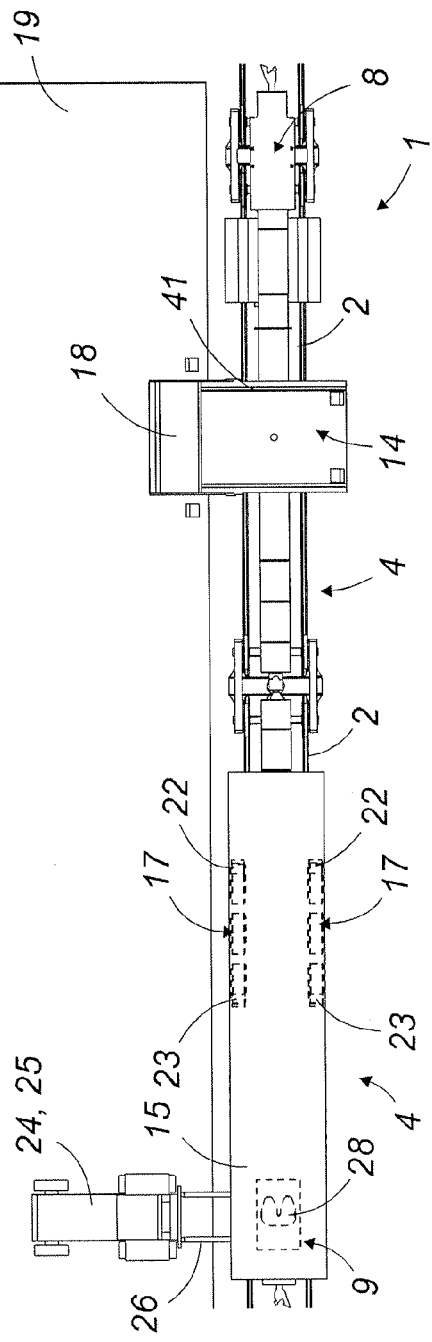

The hitch attachment 9 is then lowered on to the accommodating platform 8, centering it, so that the immobilizing pins or lugs 12 pass through the openings 13 of the body 27. The height of the hitch 28 will have been adjusted previously, if necessary, so that the semi-trailer 15 is properly horizontal when it is in the immobilized transportation position (FIGS. 31 and 32).

The unloading phases are similar to the loading phases described above, but in reverse order.

FIGS. 33 and 34 show two semi-trailers 15 in position on a dual rail wagon.

Note the perfectly horizontal positions and the universal nature of the loading and transportation system, which can be adapted for very many types of semi-trailers During the loading of semi-trailers 15 in accordance with the variant illustrated in FIGS. 35 to 38, the road haulage tractor 36 of each semi-trailer 15 positions it on the corresponding pivoting turntable 14, which is in the loading position—for instance, oblique in relation to the longitudinal axis of the wagon 1. To do this, the road haulage tractor 36 coupled to the semi-trailer 15 crosses the railway line between the two opposing trackside platforms 19, using the corresponding pivoting turntable as a crossing bridge.

The phases of immobilization of the wheel assembly 17 of the semi-trailer 15, by means of shims 21, of placement of the hitch 28 by means of the hitch attachment 9, and of pivoting of the pivoting turntable 14 are the same as for the basic version. Obviously, the pivoting turntables 14 can be motor-powered. In this case, the forklift truck 25 simply follows the movement.

In a sophisticated version, the locking of the wheels can be done automatically—for example, when one lowers the turntable 14 on the wagon 1.

A description has only been provided for a dual wagon above; obviously, a single wagon 1 falls within the scope of the invention and, to be profitable, the transportation system should preferably include a multitude of wagons that together form a railway train.

Obviously, the invention is not limited to the preferred embodiments described above and illustrated in the various figures. Many other variants are possible while remaining within the same inventive principle defined by the claims.

The invention claimed is:

1. A transportation system for loading/unloading and rail transportation of road-hauled semi-trailers, the transportation system being intended to accommodate, for rail transportation, at least one road-hauled semi-trailer (15) fitted with a kingpin (16), at a front thereof, and a wheel assembly (17), at a rear thereof, the transportation system being interactive for transfer of the semi-trailer (15) from a road haulage tractor (36) to at least one railway wagon (1) by a forklift (24) having a pair of vertically adjustable forks, and the transportation system comprising:

a chassis (2) of the at least one railway wagon (1);
an unmotorized turntable (14) that freely pivots in relation to the chassis (2), that is designed to accommodate the wheel assembly (17) of the semi-trailer (15), and the turntable (14) being sized for accommodating the wheel assembly (17) of the semi-trailer (15), but not an end of the semi-trailer (15) carrying the kingpin (16), and the turntable (14) being able to be pivoted between:
 a transportation position, in which the turntable (14) is positioned longitudinally relative to the wagon (1), and
 a loading/unloading position in which the turntable (14) is oriented transversely or obliquely in relation to the wagon (1); and
an accommodating platform (8) having an immobilization system (10);
wherein the accommodating platform (8) is connected to or integrated with the chassis (2), is fixed in relation to the chassis, and a portion of the chassis (2) separates the accommodating platform (8) from the pivoting turntable (14);
a detachable mounting (9), independent from and accommodated by the accommodating platform (8) of the chassis, for connection with the kingpin (16) of the semi-trailer (15) to be borne by the wagon (1);

the detachable mounting (9) including:
- a hitch system (28) designed to accommodate, support and immobilize the kingpin (16) of the semi-trailer (15);
- a body (27) having a base and the hitch system (28) is supported by, but spaced from, the base by at least one shaft (34, 35);
- a mechanical interface system (31) including at least one aperture (32), formed in a transverse side plate of the base, for matingly engaging with the forks of the forklift (24);
- the body (27) is designed so as to be releasably supported in a detachable manner on the accommodating platform (8) of the wagon (1); and
- a complementary immobilizing system (11) formed in the base which interoperates with the immobilizing system (10) of the accommodating platform (8) to detachably secure and temporarily restrain the base of the detachable mounting (9) on the accommodating platform (8); and the at least one aperture (32) of the base of the detachable mounting (9) releasably interacting with the forklift (24) to assist the forklift (24) with solely supporting a leading end of the semi-trailer (15) during loading and unloading of the semi-trailer (15) on the wagon (1).

2. The transportation system according to claim 1, wherein the turntable pivots freely via a pivoting system which includes a central pivoting pin with bearing rollers on a crown, jockey wheels, or roller bearings.

3. The transportation system according to claim 1, wherein the wagon (1) comprises two unmotorized, freely pivoting turntables (14) and two accommodating platforms (8) at opposing ends of the chassis (2) for enabling the transportation system to transport two semi-trailers (15) simultaneously.

4. The transportation system according to claim 1, wherein the wagon (1) of the transportation system comprises a locking system for immobilizing the pivoting turntable (14) in the transportation position and loading/unloading position in relation to the chassis (2).

5. The transportation system according to claim 1, wherein the pivoting turntable (14) has a length less than a length of the chassis (2) so that the turntable (14) may freely rotate with respect to the chassis (2) without contacting either the accommodating platform (8) or the opposite end of the chassis (2);

the length of the pivoting turntable (14) is slightly greater than that of the wheel assembly (17) of the semi-trailer (15);

a top surface of the accommodating platform (8) has a generally planar support arrangement which permits support of the detachable mounting (9) in a plurality of support positions to facilitate accommodating, on the chassis (2), semi-trailers (15) having a variety of different lengths; and when in the transportation position, the pivoting turntables (14) support only a portion of a weight of the semi-trailer (15), via the wheel assembly (17), while a remainder of the weight of the semi-trailer (15) is supported by the accommodating platform (8) via the detachable mounting (9).

6. The transportation system according to claim 1, wherein the pivoting turntable (14) comprises, two access ramps (18) at opposite extremities, and each of the two access ramps (18) are one of retractable, swinging, articulated or telescopic.

7. The transportation system according to claim 1, wherein the pivoting turntable (14) has transversal edges (20) that are curved in a convex form or oblique so as to matingly engage with a localized curved concave hollow within a trackside loading platform (19).

8. The transportation system according to claim 1, wherein the pivoting turntable (14) has forward shims (21) that are movable or removable, so as to provide passageway on the pivoting turntable (14), during loading or unloading of the semi-trailer (15), and rear shims (22) which are fixed in relation to the turntable (14) for immobilizing the wheel assembly (17) of the semi-trailer (15) when the semi-trailer (15) is loaded on the pivoting turntable (14).

9. The transportation system according to claim 1, wherein the immobilizing system (10) or the complementary immobilizing system (11) are at least one of lugs (12), pins, protrusions, fingers, hooks, protruding elements, openings (13), rings, hollows, cavities or perforated section bars (33) having multiple apertures (13).

10. The transportation system according to claim 1, wherein the immobilizing system (10) or complementary immobilizing system (11) are one of fixed, removable or articulated.

11. The transportation system according to claim 1, further comprises a temporary locking system that is separate from the immobilizing system (10) and the complementary immobilizing system (11), in addition to the immobilizing system (10) or complementary immobilizing system (11).

12. The transportation system according to claim 1, wherein the body (27) of the detachable mounting (9) comprises a mechanical base which comprises a planar frame structure of exterior or interior longitudinal plates (29) and exterior or interior transversal plates (30), with the hitch system (28) extending normal to the mechanical base.

13. The transportation system according to claim 1, wherein the base of the body comprises four side walls extending normal to the accommodating platform (8) so as to partially encompass an interior space of the base;

the at least one shaft (34, 35), which supports the hitch system (28), is supported by and extends from the interior space of the base;

the mechanical interface system (31) comprises one of rings or openings (32) which provide access to the interior space of the base; and at least a portion of the mechanical interface system (31) is formed through the four side walls, so that the forks of the forklift access the interior space of the base on either side of the at least one. shaft (34,35).

14. The transportation system according to claim 1, wherein:

the hitch system (28) is adjustable heightwise in relation to the body (27) of the detachable mounting (9); and the turntable (14) has a fixed vertical height relative to the chassis (2) such that the turntable (14) only pivots in relation to the chassis (2) between the transportation position and the loading unloading position at a single height.

15. The transportation system according to claim 1, wherein the base of the detachable mounting (9) has a substantially planar portion which matingly engages with the accommodating platform (8); and the hitch system (28) is a standardized hitch having a convergent entry (37), a slot (38) for the kingpin (16), and a locking system for the kingpin (16).

16. The transportation system according to claim 1, wherein the detachable mounting (9) comprises a means of longitudinal displacement of the hitch system (28) in relation to the body (27).

17. The transportation system according to claim 1, wherein the at least one shaft (34, 35) of the detachable mounting (9) comprises
- a first shaft (34) freely pivoting on the body (27);
- a second shaft (35) extending telescopically from a free extremity of the first shaft (34), such that the hitch system (28) is pivotally assembled on the second shaft (35) of the detachable mounting (9); and
- the detachable mounting (9) has both a width and a length which is greater that a width and length of the at least one shaft (34,35) of the detachable mounting (9) which supports the hitch system (28).

18. The transportation system according to claim 17, wherein the first shaft (34) is mechanically secured to the body (27) by an oblique arcing (40) which facilates elastic return of the at least one shaft (34, 35) to a straight and vertical position (34).

19. A process for loading a road-hauled semi-trailer (15) equipped with a kingpin (16), at a front thereof, and a wheel assembly (17), at a rear thereof, from a road haulage tractor (36) via a forklift (24) having a pair of vertically adjustable forks, onto a railway wagon (1) forming part of a transportation system for loading/unloading and rail transportation of road-hauled semi-trailers, the wagon (1) having a chassis (2) and at least one accommodating platform (8), the transportation system comprising:
- at least one turntable (14) that pivots in relation to the chassis (2), that is designed and sized to accommodate the wheel assembly (17) of the semi-trailer (15) but not the front of the semi-trailer(15) carrying the Kingpin (16) the turntable (14) being able to be pivoted between:
  - a transportation position in which the turntable (14) is positioned longitudinally relative to the wagon (1), and
  - a loading/unloading position in which the turntable (14) is oriented transversely or obliquely in relation to the wagon (1); and
- at least one accommodating platform (8) designed to accommodate a mounting for the kingpin (16) of the semi-trailer (15) and having a means of immobilization (10) of the mounting;
- wherein the accommodating platform (8) is connected to or integrated with the chassis (2) and fixed in relation to the chassis, and a portion of the chassis (2) separates the accommodating platform (8) from the pivoting turntable (14);
- a detachable mounting (9) is accommodated by the accommodating platform (8) for detachably connecting the kingpin (16) of the semi-trailer (15) to the wagon (1); and
- the detachable mounting (9) comprises:
  - a body (27) having a hitch system (28), atleast one shaft (34, 35) and a base that is transversally grippable by the forklift (24);
  - the hitch system (28) designed to accommodate, support and immobilize the kingpin (16) of the semi-trailer (15), and the hitch system (28) is supported by, but spaced from, the base by at least one shaft (34, 35);
  - at least one aperture (32), of a mechanical interface system (31) that is formed in transversal plates (30) of the base, is compatible with the forks of the forklift (24), and the at least one aperture (32) is capable of matingly engaging with the forks of the forklift (24);
  - the body (27) is supported, in a detachable manner, on the accommodating platform (8) of the wagon (1): and
  - a complementary immobilizing system (11) interoperates with an immobilizing system (10) of the accommodating platform (8) to detachably secure and temporarily restrain the detachable mounting (9) on the accommodating platform (8);
- wherein the process comprises:
- pivoting and immobilization of the pivoting turntable (14) into the loading/unloading position;
- moving the semi-trailer (15), via the road haulage tractor (36), so as to position the wheel assembly (17) of the semi-trailer (15) on the pivoting turntable (14);
- uncoupling of the semi-trailer (15) and the road haulage tractor (36);
- gripping of the body (27), via the at least one of the aperture (32)of the detachable mounting (9), by the forks of the forklift (24), using the mechanical interface system (31);
- transversally positioning the hitch system (28) of the detachable mounting (9) on the kingpin (16) of the semi-trailer (15) to solely support a leading end of the semi-trailer (15) during loading and unloading of the semi-trailer (15) on the wagon (1);
- transversally moving the detachable mounting (9) by the forklift (24) so as to cause the pivoting of the semi-trailer (15) and pivoting of the turntable (14) into the transportation position; and
- positioning of the detachable mounting (9) on the accommodating platform (8), and immobilization thereof by interoperation with the immobilizing system (10) of the accommodating platform (8) and complementary immobilizing system (11) of the detachable mounting (9).

20. The loading method according to claim 19, further comprising the step of, during the step of moving the semi-trailer (15) by the haulage tractor (36), moving the road haulage tractor (36) backward without traveling upon the pivoting turntable (14), or moving forward without traveling across the pivoting turntable (14).

21. The loading process according to claim 19, further comprising the steps of:
- adjusting the height of the hitch system (28) in relation to the body (27) of the detachable mounting (9) so that the semi-trailer (15) is positioned substantially horizontally when the semi-trailer (15) is loaded on the wagon (1) in the rail transportation position.

22. The loading process according to claim 19, further comprising the step of immobilizing at least one wheel of the wheel assembly (17) of the semi-trailer (15), via shims (21), when the semi-trailer (15) is placed on the pivoting turntable (14).

23. The loading process according to claim 19, further comprising the step of, during the step of positioning with the forklift (24) of the hitch system (28) of the detachable mounting (9) on the kingpin (16) of the semi-trailer (15), automatically locking the kingpin (16) in relation to the removable mounting (9).

24. A process for loading a road-hauled semi-trailer (15) equipped with a kingpin (16), at the front thereof, and with a wheel assembly (17), at the rear thereof, on to a railway wagon (1), the wagon (1) having a chassis (2), the transportation system comprising:
- at least one turntable (14) that pivots in relation to the chassis (2), that is designed to accommodate the wheel assembly (17) of the semi-trailer (15), the turntable (14) being sized for accommodating the wheel assembly (17)

of the semi-trailer (15) but not the front of the semi-trailer (15) carrying the kingpin (16), and the turntable (14) being able to be pivoted between a transportation position, in which the turntable (14) is positioned longitudinally relative to the wagon (1), and a loading/unloading position in which the turntable (14) is oriented transversely or obliquely in relation to the wagon (1); and at least one accommodating platform (8) designed to accommodate a detachable mounting (9) for the kingpin (16) of the semi-trailer (15) and having a means of immobilization (10) of the detchable mounting;

wherein the accommodating platform (8) is connected to or integrated with the chassis (2), and is fixed in relation to this chassis thereto and a portion of the chassis (2) separates the accommodating platform (8) from the pivoting turntable (14);

the detachable mounting (9) comprises:

a body (27) having a hitch system (28), at least one shaft (34, 35) and a base that is transversely grippable by a forklift (24) having a pair of vertically adjustable forks and, for this, comprises at least one aperture (32) of a mechanical interface system (31) being formed in transverse plates (30) of the base that is compatible with the forks of the forklift (24) such that the body matingly engages with the forks of the forklift (24), the body (27) being supported, in a detachable manner, firstly by the forklift (24) and secondly on the accommodating platform (8) of the wagon (1), a complementary immobilizing system (11) that interoperates with the immobilizing system (10) of the accommodating platform (8) to detachably secure and temporarily restrain the detachable mounting (9) on the accommodating platform (8); and the hitch system (28) designed to accommodate, support and immobilize the kingpin (16) of the semi-trailer (15), and the hitch system (28) is supported by, but spaced from, the base by the at least one shaft (34, 35);

wherein the process comprises the following steps:

pivoting and immobilization of the pivoting turntable (14) in the loading/unloading position;

transversely gripping the body (27) of the detachable mounting (9) via the forks of the forklift (24) using the at least one aperture (32) of formed in transverse plates (30) of the base, and transversely positioning the hitch system (28) of the detachable mounting (9) on the kingpin (16) of a semi-trailer (15) uncoupled from a road haulage tractor (36) to solely support a leading end of the semi-trailer (15) during loading and unloading of the semi-trailer (15) on the wagon (1);

transversely moving the detachable mounting (9), via the forklift (24), so as to cause the movement of the semi-trailer (15) and placement of the wheel assembly (17) of the semi-trailer (15) on the pivoting turntable (14);

continue moving the detachable mounting (9), via the forklift (24), so as to cause pivoting of the semi-trailer (15) and pivoting of the pivoting turntable (14) into the transportation position; and supporting the detachable mounting (9) on the accommodating platform (8), and immobilization thereof by interoperation with the immobilizing system (10) of the accommodating platform (8) and complementary immobilizing system (11) of the detachable mounting (9).

* * * * *